United States Patent
Jiang et al.

(10) Patent No.: US 10,885,357 B2
(45) Date of Patent: Jan. 5, 2021

(54) RECORDING MEDIUM RECORDING INFORMATION PROCESSING PROGRAM, INFORMATION PROCESSING METHOD, AND INFORMATION PROCESSING APPARATUS

(71) Applicant: FUJITSU LIMITED, Kawasaki (JP)

(72) Inventors: Shan Jiang, Machida (JP); Sosuke Yamao, Atsugi (JP); Shigeyuki Odashima, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 16/447,926

(22) Filed: Jun. 20, 2019

(65) Prior Publication Data

US 2019/0318179 A1    Oct. 17, 2019

Related U.S. Application Data

(63) Continuation of application No. PCT/JP2017/001265, filed on Jan. 16, 2017.

(51) Int. Cl.
*G06K 9/00* (2006.01)
*G06T 7/215* (2017.01)
(Continued)

(52) U.S. Cl.
CPC ..... *G06K 9/00812* (2013.01); *G06K 9/00208* (2013.01); *G06T 7/11* (2017.01);
(Continued)

(58) Field of Classification Search
CPC ........... G06K 9/00812; G06K 9/00208; G06K 9/00805; G06K 9/00791; G06K 9/00798;
(Continued)

(56) References Cited

U.S. PATENT DOCUMENTS

| | | | |
|---|---|---|---|
| 9,082,008 B2 * | 7/2015 | Ma | G06T 7/73 |
| 9,870,624 B1 * | 1/2018 | Narang | G06T 7/55 |

(Continued)

FOREIGN PATENT DOCUMENTS

| | | |
|---|---|---|
| JP | 2002-170103 | 6/2002 |
| JP | 2007-315956 | 12/2007 |

(Continued)

OTHER PUBLICATIONS

"On-street Parking Statistics Using LiDAR Mobile Mapping"; Fabian Bock, 2015 IEEE 18th International Conference on Intelligent Transportation Systems (pp. 2812-2818) (Year: 2015).*

(Continued)

*Primary Examiner* — Michael S Osinski
(74) *Attorney, Agent, or Firm* — Fujitsu Patent Center

(57) ABSTRACT

A recording medium records an information processing program for causing a computer to execute processing including: acquiring an image from an imaging device provided in a first moving body; estimating a self-position of the first moving body by a first algorithm based on the image; generating a first point group that indicates a three-dimensional shape around the first moving body; generating a second point group that indicates the three-dimensional shape by a second algorithm based on data used in the first algorithm; merging the first point group and second point group so as to generate a third point group; extracting a space of an area group where a second moving body is parked from the third point group based on a movement track of the first moving body and information regarding a size of the second moving body; dividing the extracted space; and specifying each area of the area group.

12 Claims, 20 Drawing Sheets

(51) Int. Cl.
*G06T 7/11* (2017.01)
*G06T 7/73* (2017.01)
*G08G 1/14* (2006.01)

(52) U.S. Cl.
CPC ............... *G06T 7/215* (2017.01); *G06T 7/73* (2017.01); *G08G 1/14* (2013.01); *G06T 2207/20021* (2013.01); *G06T 2207/30264* (2013.01)

(58) Field of Classification Search
CPC ........... G06K 9/00201; G06K 9/00214; G06K 9/00476; G06T 7/215; G06T 7/11; G06T 7/73; G06T 7/70; G06T 7/74; G06T 7/55; G06T 7/579; G06T 7/251; G06T 2207/20021; G06T 2207/30264; G06T 2207/30252; G06T 2207/10016; G06T 2207/10028; G06T 2207/30244; G06T 2207/10012; G06T 2207/10024; G06T 2207/30261; G06T 3/4038; G08G 1/14; G08G 1/16–168
See application file for complete search history.

(56) References Cited

U.S. PATENT DOCUMENTS

| | | | |
|---|---|---|---|
| 10,121,247 B2* | 11/2018 | Meier | H04N 7/185 |
| 10,540,807 B2* | 1/2020 | Yamamoto | G06T 15/10 |
| 10,595,003 B2* | 3/2020 | Ohara | H04N 13/106 |
| 10,602,059 B2* | 3/2020 | Beers | G06T 3/005 |
| 10,783,794 B2* | 9/2020 | Li | G01C 11/025 |
| 2005/0238200 A1 | 10/2005 | Gupta et al. | |
| 2007/0109408 A1* | 5/2007 | Watanabe | B60R 1/00 |
| | | | 348/148 |
| 2008/0137940 A1* | 6/2008 | Kakinami | G06T 7/593 |
| | | | 382/154 |
| 2009/0257659 A1* | 10/2009 | Suzuki | G06T 3/4038 |
| | | | 382/199 |
| 2014/0118341 A1* | 5/2014 | Shimizu | G06T 3/4038 |
| | | | 345/419 |
| 2014/0192145 A1* | 7/2014 | Anguelov | H04N 5/23238 |
| | | | 348/36 |
| 2014/0247352 A1* | 9/2014 | Rathi | H04N 5/2258 |
| | | | 348/148 |
| 2015/0091715 A1* | 4/2015 | Nomura | G08G 1/166 |
| | | | 340/435 |
| 2015/0098623 A1* | 4/2015 | Shimizu | G06T 7/521 |
| | | | 382/104 |
| 2015/0206015 A1* | 7/2015 | Ramalingam | G06K 9/00791 |
| | | | 382/104 |
| 2016/0350906 A1* | 12/2016 | Meier | G06T 7/579 |
| 2017/0116743 A1* | 4/2017 | Matsumoto | G06K 9/00805 |
| 2017/0253236 A1* | 9/2017 | Hayakawa | B60W 30/06 |
| 2017/0352275 A1* | 12/2017 | Maruyama | H04N 7/181 |
| 2018/0189565 A1* | 7/2018 | Lukierski | H04N 5/23238 |
| 2019/0243372 A1* | 8/2019 | Huval | G08G 1/167 |
| 2019/0311546 A1* | 10/2019 | Tay | G01S 17/931 |
| 2019/0333384 A1* | 10/2019 | Kuroda | B60R 21/00 |
| 2019/0392609 A1* | 12/2019 | Bae | G06T 7/55 |
| 2020/0090367 A1* | 3/2020 | Nishiyama | H04N 13/366 |
| 2020/0098135 A1* | 3/2020 | Ganjineh | G01C 21/32 |
| 2020/0109954 A1* | 4/2020 | Li | G01C 21/32 |
| 2020/0238907 A1* | 7/2020 | Watanabe | G06T 17/00 |
| 2020/0238909 A1* | 7/2020 | Yamamoto | B60R 1/00 |
| 2020/0307456 A1* | 10/2020 | Michiguchi | G02B 27/0172 |

FOREIGN PATENT DOCUMENTS

| | | |
|---|---|---|
| JP | 2007-535765 | 12/2007 |
| JP | 2009-193240 | 8/2009 |
| JP | 2012-118909 | 6/2012 |
| WO | 2015/107623 | 7/2015 |

OTHER PUBLICATIONS

"Collaborative Mapping and Autonomous Parking for Multi-Story Parking Garage"; Bing Li, 2018 IEEE Transactions on Intelligent Transportation Systems (vol. 19, Issue: 5, pp. 1629-1639) (Year: 2018).*

"Autonomous driving in a multi-level parking structure"; Kummerle, R., 2009 IEEE International Conference on Robotics and Automation (pp. 3395-3400) (Year: 2009).*

International Search Report, mailed in connection with PCT/JP2017/001265 and dated Apr. 18, 2017 (1 page).

* cited by examiner

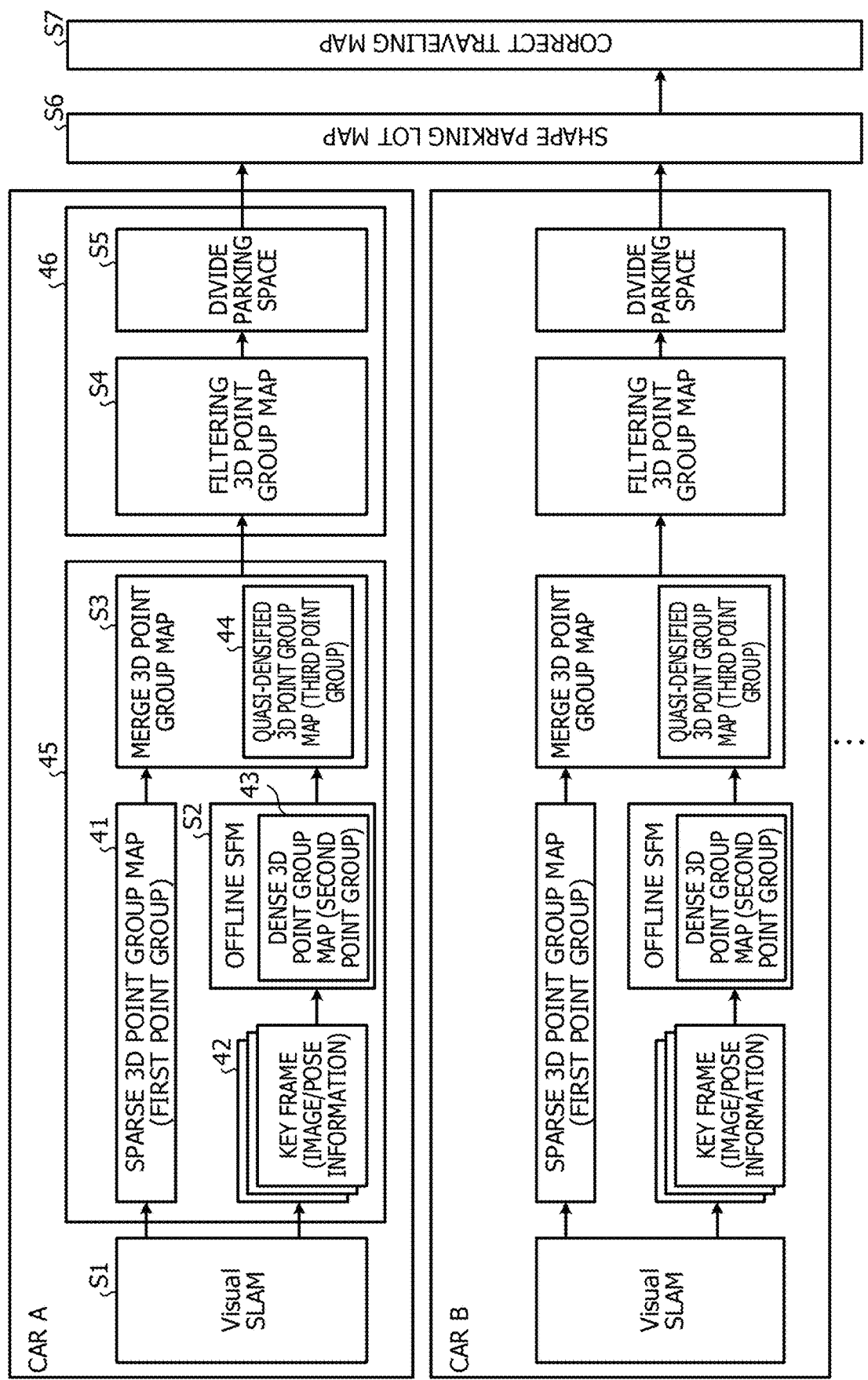

FIG. 14
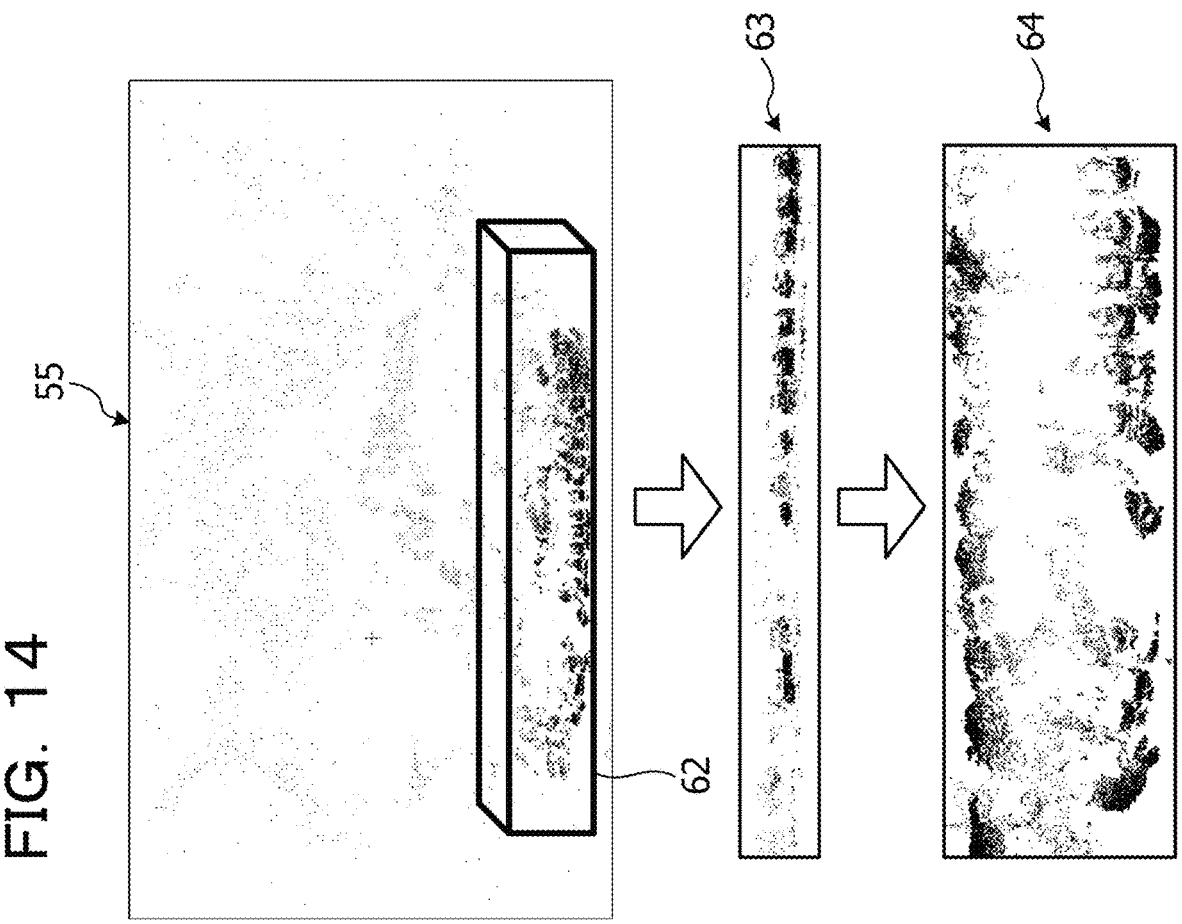
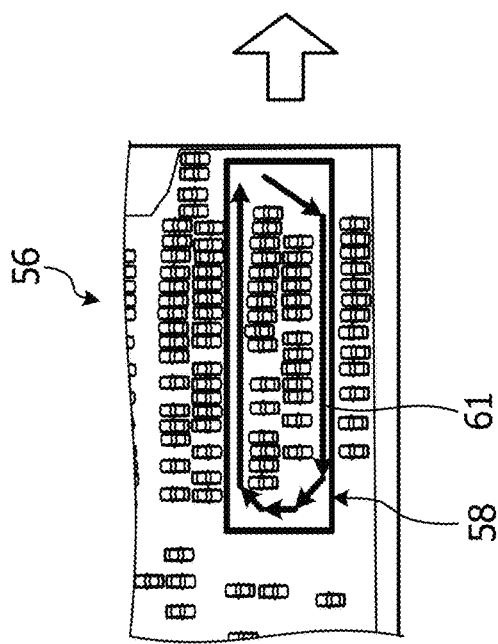

FIG. 17
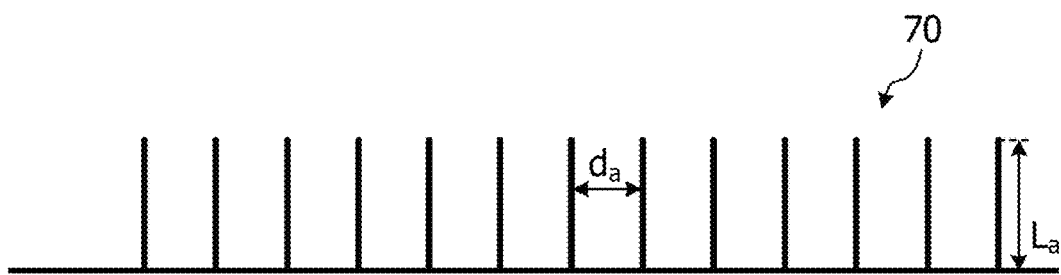
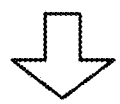
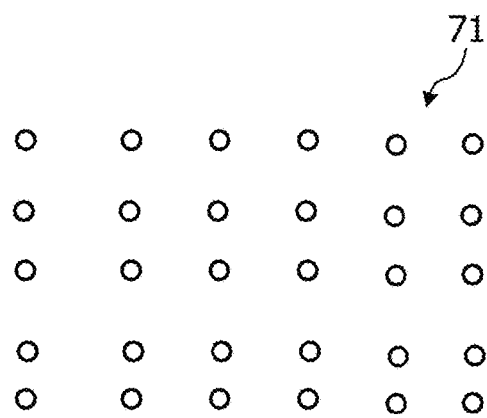
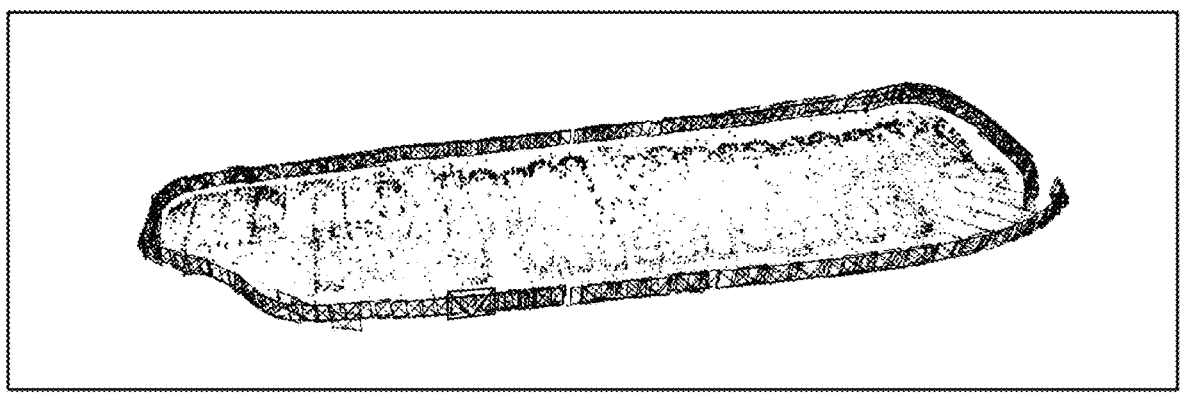

US 10,885,357 B2

RECORDING MEDIUM RECORDING INFORMATION PROCESSING PROGRAM, INFORMATION PROCESSING METHOD, AND INFORMATION PROCESSING APPARATUS

CROSS-REFERENCE TO RELATED APPLICATION

This application is a continuation application of International Application PCT/JP2017/001265 filed on Jan. 16, 2017 and designated the U.S., the entire contents of which are incorporated herein by reference.

FIELD

The embodiments relate to an information processing program, an information processing method, and an information processing apparatus.

BACKGROUND

In recent years, automatic travel and autonomous navigation of cars, robots, drones, and the like using various sensors have been proposed Related art is disclosed in Japanese Laid-open Patent Publication No. 2012-118909, Japanese National Publication of International Patent Application No. 2007-535765, Japanese Laid-open Patent Publication No. 2007-315956, and Japanese Laid-open Patent Publication No. 2002-170103.

SUMMARY

According to an aspect of the embodiments, a non-transitory computer-readable recording medium records an information processing program for causing a computer to execute processing including: acquiring an image which is imaged by an imaging device provided in a first moving body; estimating a self-position of the first moving body by a first algorithm based on the acquired image; generating a first point group that indicates a three-dimensional shape around the first moving body; generating a second point group that indicates the three-dimensional shape by a second algorithm based on data which is used in the first algorithm; merging the generated first point group and second point group so as to generate a third point group; extracting a space of an area group where a second moving body is parked from the third point group based on a movement track of the first moving body and information regarding a size of the second moving body; dividing the extracted space; and specifying each area of the area group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A and 10B are a diagram illustrating an outline of processing of the information processing system according to the embodiment.

FIG. 14 is a diagram illustrating an example of extraction of a parking space.

FIG. 17 is a diagram illustrating an example of correction of the traveling map based on a width and a depth of the specified parking area.

DESCRIPTION OF EMBODIMENTS

The automatic travel and the like are performed, for example, by estimating a self-position while referring to a map. In a case of a car, for example, maps of various places such as highways, private parking lots, and in addition, private facilities are required. However, there are many cases where a small parking lot and the like does not have an accurate map. Therefore, for example, a method for estimating the position of the vehicle position while generating a map such as simultaneous localization and mapping (SLAM) may be proposed.

Furthermore, it may be proposed that information such as surrounding environment, a vehicle position, a vehicle posture, and the like recognized by the SLAM and the like are accumulated in association with each other and a travel route is set from a plurality of routes on which the vehicle can travel based on the current vehicle position and vehicle posture and the accumulated information. Furthermore, it may be proposed to perform positioning by executing wide baseline matching relative to a recognition image by using feature descriptors of a map in a case where a robot for executing the SLAM experiences a change in an appearance. Furthermore, it may be proposed to generate a parking lot map by detecting white lines in a parking region of a parking lot by image processing and guide the vehicle in the parking lot based on the generated parking lot map when the vehicle enters the parking lot again. Furthermore, it may be proposed to determine whether a parking space exists by using an ultrasonic sensor and create a map indicating the parking space based on the imaged image in a case where the parking space exists.

However, when a map is generated by using the SLAM, sparse information, that is, loose information is extracted as a map. Therefore, it is difficult to use the SLAM, for example, for usage of generating a map of a parking lot which can be easily understood by a person, that is usage other than automatic travel. In addition, there is a case where no white lines are provided in a parking region of a small parking lot. Therefore, there is a case where it is difficult to create a map of a parking lot by using a method for detecting the white lines.

For example, an information processing program, an information processing method, and an information processing apparatus which can easily specify a parking area may be provided.

Embodiments of an information processing program, an information processing method, and an information processing apparatus disclosed in the present application will be described in detail with reference to the drawings below. The present embodiment does not limit the disclosed technology. In addition, the following embodiments may be appropriately combined in a range where no inconsistency occurs.

Embodiment

Figure 1:
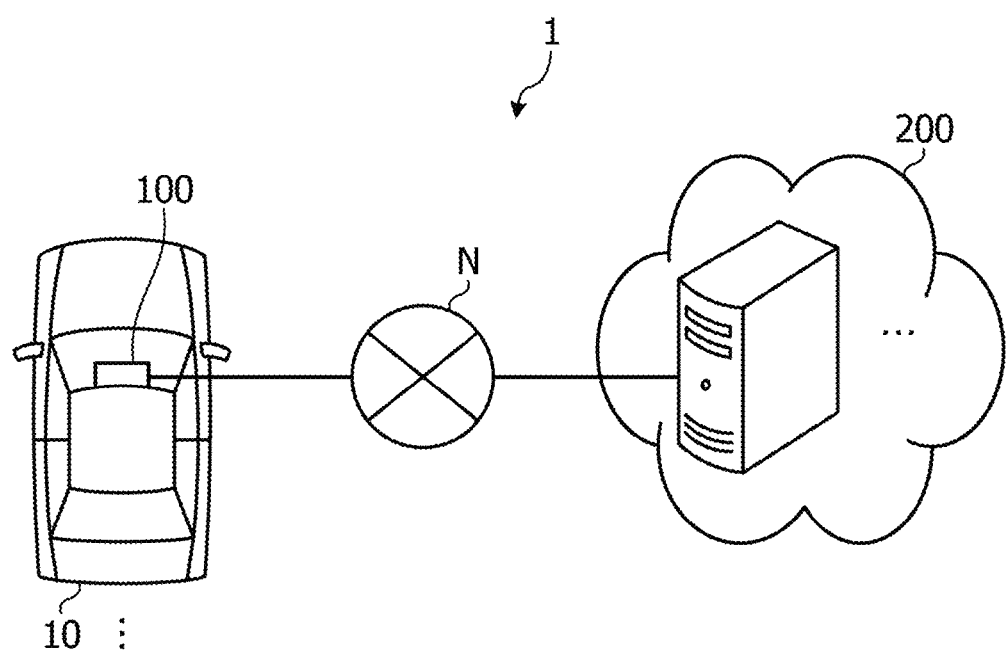
FIG. 1 is a diagram illustrating an exemplary configuration of an information processing system according to an embodiment.

FIG. 1 is a diagram illustrating an exemplary configuration of an information processing system according to an embodiment. An information processing system 1 illustrated in FIG. 1 includes an information processing apparatus 100 mounted in a vehicle 10 which is a car and a cloud 200. The number of vehicles 10 and the number of information processing apparatuses 100 are not limited, and any number of vehicles 10 and information processing apparatuses 100 may be included. The information processing apparatus 100 and the cloud 200 are communicably connected to each other via a network N. Any type of communication network such as a local area network (LAN) and a virtual private network (VPN) as well as the Internet can be adopted for the network N regardless of whether the network is wired or wireless.

The information processing system 1 is, for example, a system for generating a map for automatic drive in a parking lot. The information processing system 1, for example, collects a vehicle position, map information, a travel history, and the like transmitted from the information processing apparatus 100 mounted in the vehicle 10 by the cloud 200 and stores various information regarding the parking lot in a database. The database of the cloud 200 stores, for example, dynamic information such as a parked vehicle in the parking lot and the like, a map for travel planning, a map for vehicle position estimation. When the vehicle 10 travels in the parking lot, the information processing apparatus 100 acquires surrounding environment information by using a camera and estimates the vehicle position and generates a map.

The information processing apparatus 100 is an information processing apparatus mounted in the vehicle 10 and is a computer which executes processing regarding automatic drive of the vehicle 10. In a case where the cloud 200 has an initial map for traveling, the information processing apparatus 100 acquires the initial map for traveling from the cloud 200. The information processing apparatus 100 acquires an image imaged by an imaging device provided in the vehicle 10 which is a first moving body. The information processing apparatus 100 estimates a self-position of the first moving body by a first algorithm based on the acquired image and generates a first point group indicating a three-dimensional shape around the first moving body. Note that, in the following description, in a case where the first moving body is the vehicle 10, there is a case where an expression of a vehicle position is used instead of the self-position. The information processing apparatus 100 generates a second point group indicating a three-dimensional shape by a second algorithm based on data used in the first algorithm. The information processing apparatus 100 generates a third point group by merging the generated first point group with the generated second point group. The information processing apparatus 100 extracts a space of an area group where a second moving body is parked from the third point group based on a movement track of the first moving body and information regarding a size of the second moving body. The information processing apparatus 100 specifies each area of the area group, that is, a parking area by dividing the extracted space. With this operation, the information processing apparatus 100 can easily specify the parking area.

The cloud 200 is an example of a parking lot dynamic map cloud which collects the vehicle position, the map information, the travel history, and the like transmitted from the information processing apparatus 100 and stores various information regarding the parking lot in a database. Based on various information regarding the parking lot collected from one or more information processing apparatuses 100, the parking lot dynamic map cloud shapes the parking lot map and corrects the traveling map. Furthermore, various information such as the parking lot map and the like are provided to other service of the cloud 200.

Figure 2:
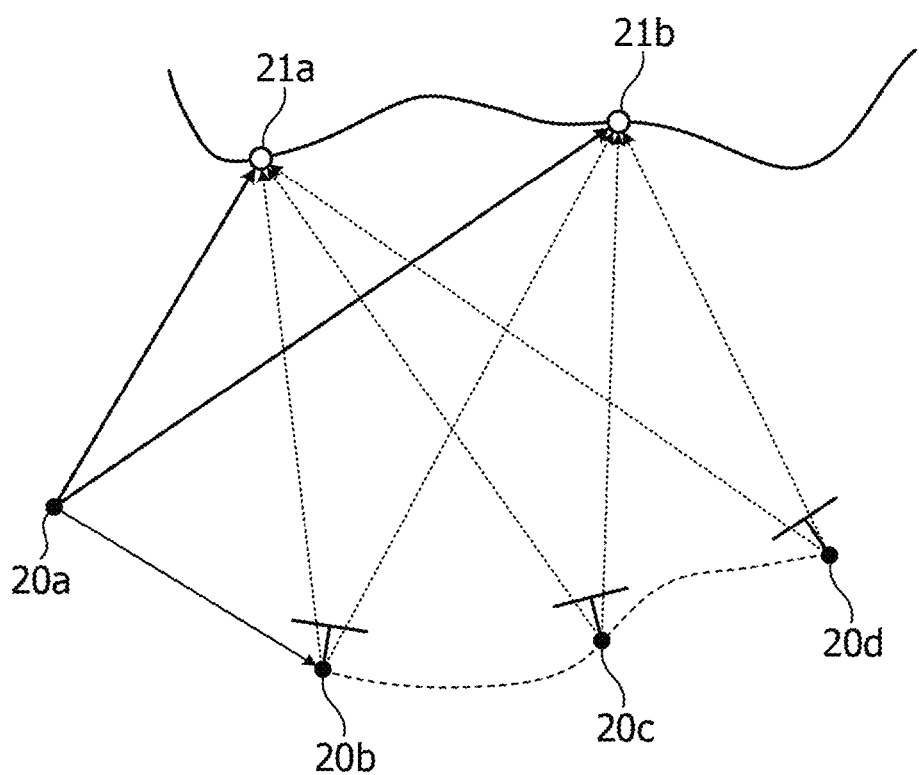
FIG. 2 is a diagram illustrating an outline of SLAM.

Here, with reference to FIGS. 2 to 8, the SLAM which estimates the vehicle position while generating a map will be described. FIG. 2 is a diagram illustrating an outline of the SLAM. FIG. 2 illustrates an outline of processing of the Visual SLAM which is an example in which the SLAM is performed by using an image acquired by a camera. In FIG. 2, the camera moves in order of positions 20a, 20b, 20c, and 20d and images environmental characteristic points (referred to as landmark below) 21a and 21b while changing a direction of the camera, that is, the posture. The Visual SLAM estimates the vehicle position while generating the map based on the position and the posture of the camera and the environmental characteristic points on the image imaged at each position.

Figure 3:
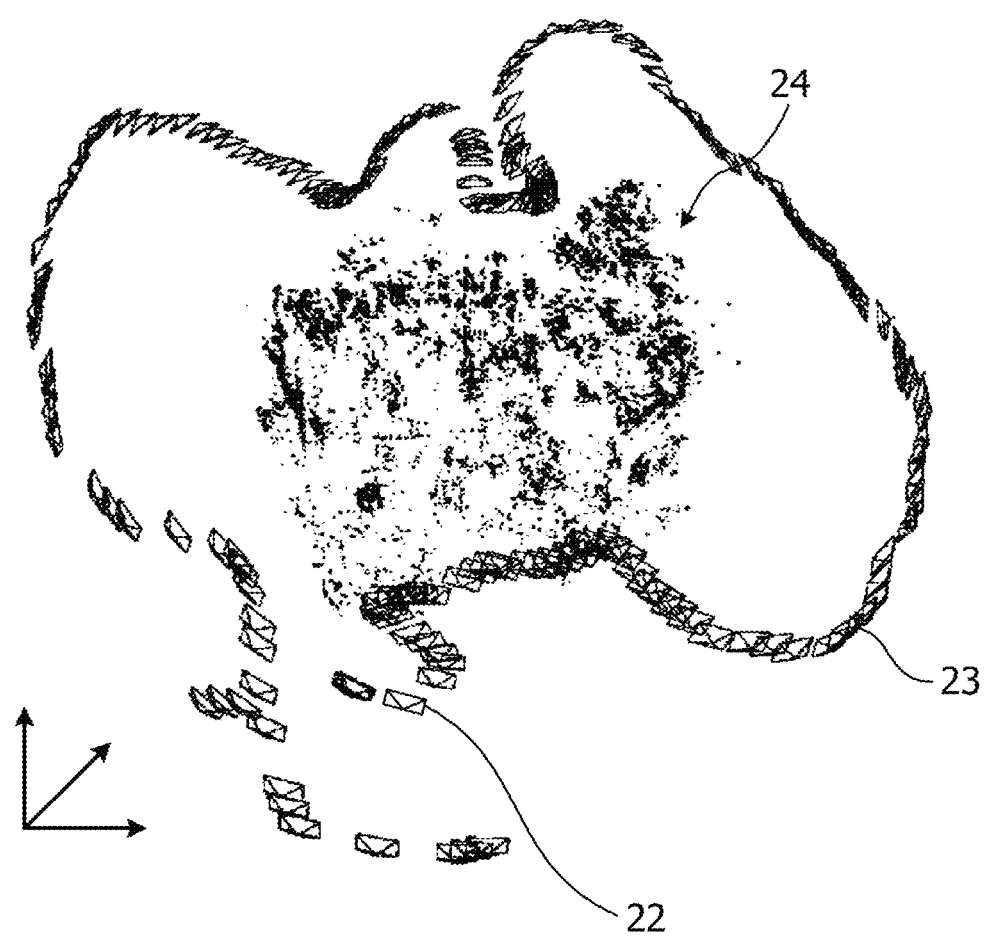
FIG. 3 is a diagram illustrating an example of an output of the SLAM.

FIG. 3 is a diagram illustrating an example of an output of the SLAM. The output example in FIG. 3 includes a current position 22 of the camera, a key frame 23 of the position where the image is imaged by the camera, and a point group 24 indicating three-dimensional environmental characteristic points.

Figure 4:
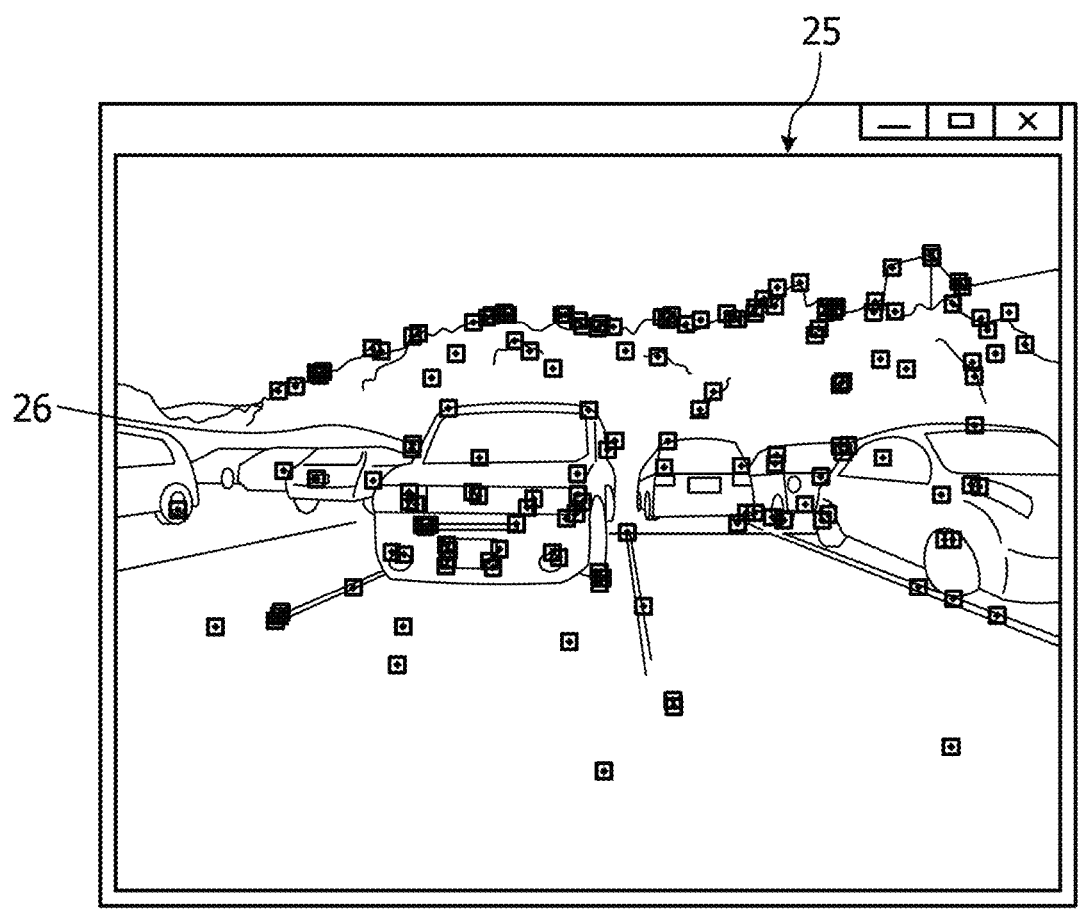
FIG. 4 is a diagram illustrating an example of environmental characteristic points.

FIG. 4 is a diagram illustrating an example of the environmental characteristic points. A screen 25 illustrated in FIG. 4 displays environmental characteristic points 26 of an image in a certain key frame. The environmental characteristic points 26 indicate, for example, corners of parked vehicles, tops of trees, corners of buildings, and the like. Note that, in FIG. 4, a single environmental characteristic point 26 is denoted by a reference numeral as a representative environmental characteristic point.

Figure 5:
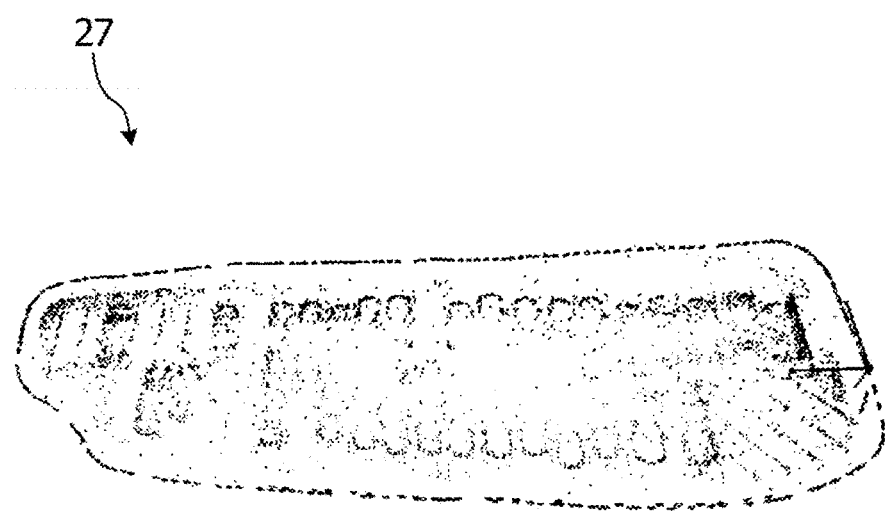
FIG. 5 is a diagram illustrating an example of a traveling map.

FIG. 5 is a diagram illustrating an example of the traveling map. A traveling map 27 illustrated in FIG. 5 is a map having a point group of three-dimensional environmental characteristic points used for automatic travel in a certain parking lot. The traveling map 27 is expressed by a sparse, that is, loose point group of the environmental characteristic points. Therefore, it is difficult to use the traveling map 27 in a case where a person looks at the traveling map 27 or for other services.

Figure 6:
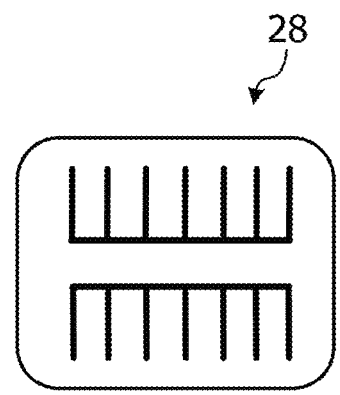
FIG. 6 is a diagram illustrating an example of an ideal parking lot map.

FIG. 6 is a diagram illustrating an example of an ideal parking lot map. A parking lot map 28 illustrated in FIG. 6 is an example of an ideal parking lot map which is easily used in a case where a person looks at the parking lot map 28 and for other services. A map in which a parking area can be found at a glance such as the parking lot map 28 is easy to understand when a person looks at the map, and the map is easily applied to the other service, for example, a service for providing information on parking lot availability.

Figure 7:
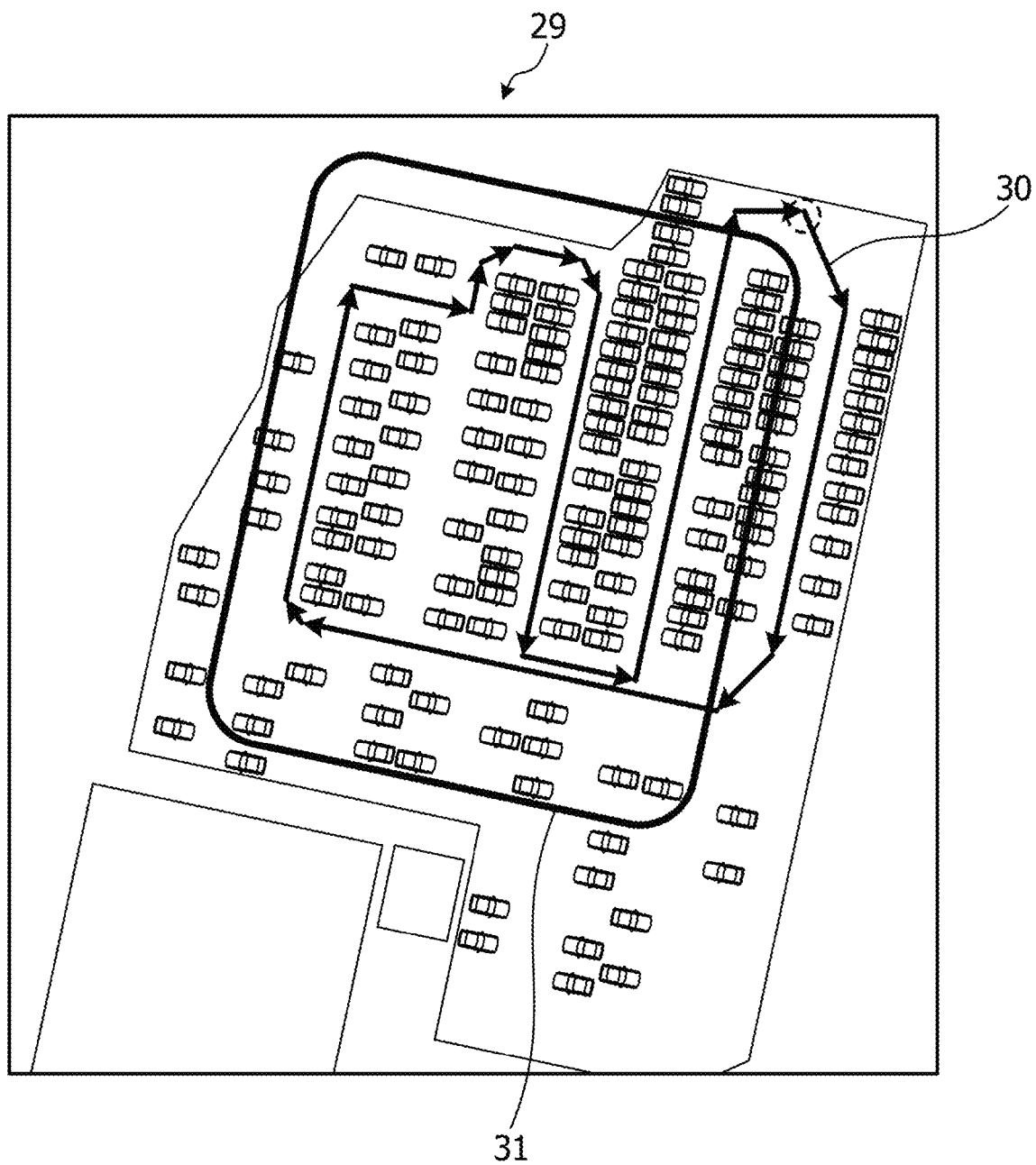
FIG. 7 is a diagram illustrating an example of an actual travel route.
Figure 8:
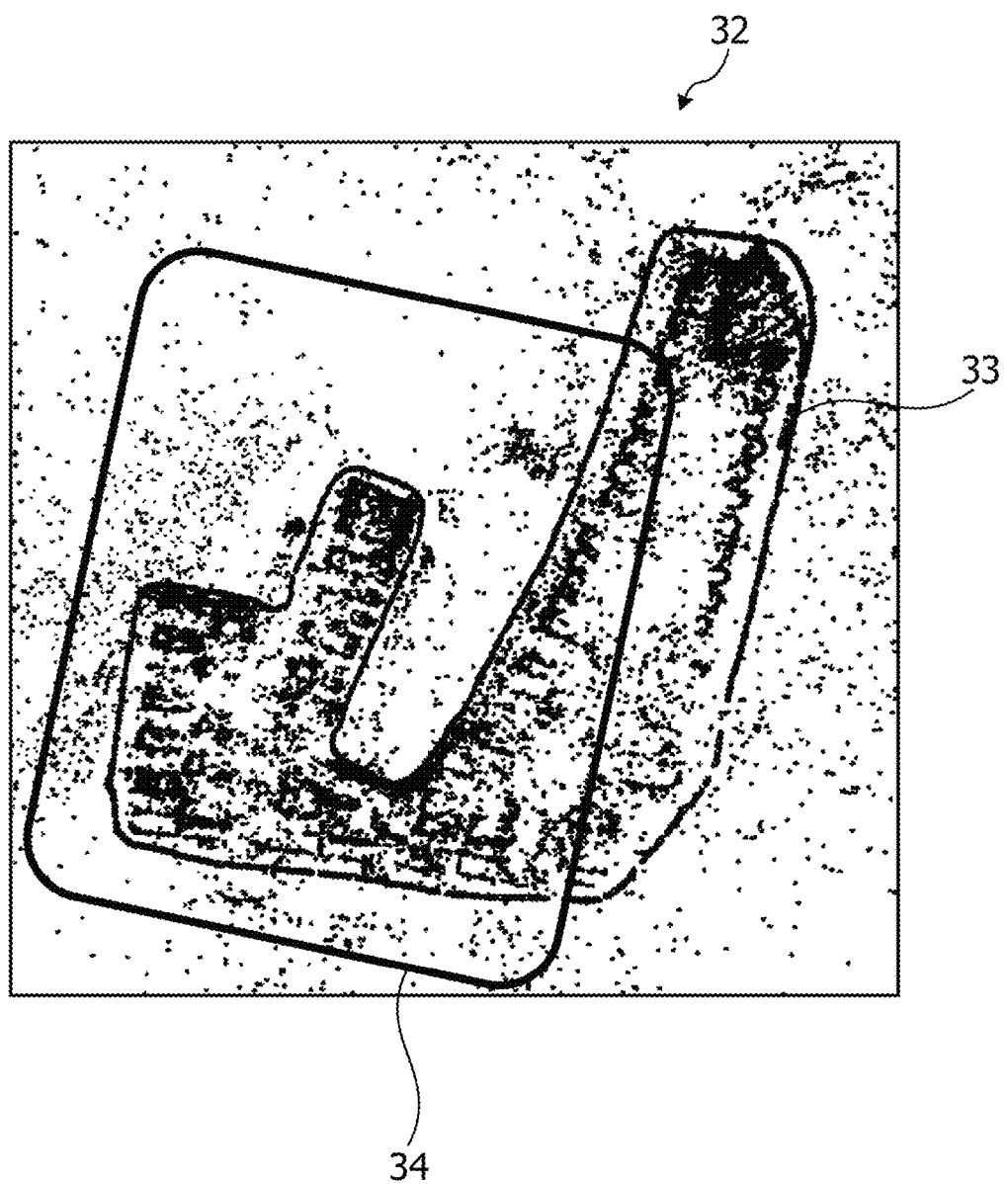
FIG. 8 is a diagram illustrating an example of a travel route and a traveling map according to the SLAM.

FIG. 7 is a diagram illustrating an example of an actual travel route. FIG. 8 is a diagram illustrating an example of a travel route and a traveling map by the SLAM. A travel route 30 in a parking lot 29 illustrated in FIG. 7 is an example of the actual travel route. Furthermore, a traveling map 32 in FIG. 8 is a traveling map generated by the Visual SLAM. In comparison with the actual travel route 30, a travel route 33 in the traveling map 32 has a drift error in a region 34 in FIG. 8 corresponding to a region 31 in FIG. 7. In the traveling map 32, map accuracy is deteriorated due to the occurrence of the drift errors in the parking lot 29. The present invention improves the map accuracy by correcting the traveling map by using the generated parking lot map with respect to such drift errors.

Figure 9:
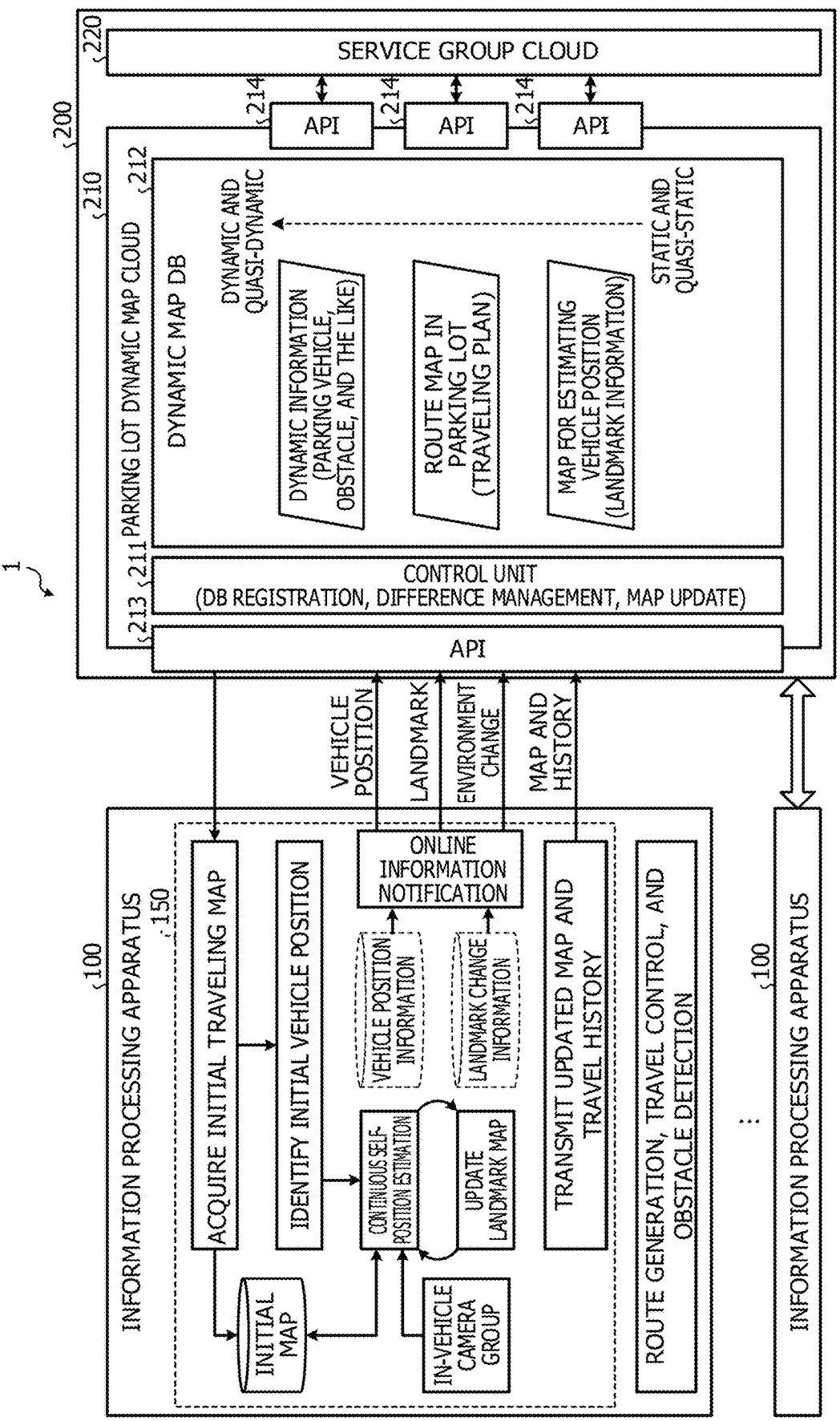
FIG. 9 is a diagram illustrating an example of an outline of a functional configuration of the information processing system according to the embodiment.

Next, an outline of a functional configuration and processing of the information processing system 1 will be described with reference to FIGS. 9 and 10. FIG. 9 is a diagram illustrating an example of the outline of the functional configuration of the information processing system according to the embodiment. As illustrated in FIG. 9, the information processing system 1 exchanges various information between the information processing apparatus 100 and the cloud 200. The information processing apparatus 100 executes processing such as route generation, travel control, and obstacle detection in addition to SLAM processing 150. In the SLAM processing 150, an initial traveling map is acquired from the cloud 200 and is stored, and an initial vehicle position is identified. After that, based on images input from an in-vehicle camera group, continuous self-position estimation processing and landmark map update are performed. Note that a landmark map is a traveling map which is a point group of the environmental characteristic points. Furthermore, in the SLAM processing 150, the estimated vehicle position information and landmark change information are transmitted to the cloud 200 via the network N, for example, by using a cellular phone line and the like. Moreover, the SLAM processing 150 similarly transmits the updated landmark map and the travel history to the cloud 200. Furthermore, the SLAM processing 150 executes generation processing of a parking lot map which is not illustrated.

The cloud 200 includes a parking lot dynamic map cloud 210 which executes processing regarding the generation of the parking lot map and the generation of the traveling map and a service group cloud 220 which provides other service group. The parking lot dynamic map cloud 210 includes a control unit 211, a dynamic map database (database is referred to as DB below) 212, and application programming interfaces (API) 213 and 214. The control unit 211 executes processing such as registration of various information in the DB, difference management, and map update. The dynamic map DB 212 stores static and quasi-static information to dynamic and quasi-dynamic information. The dynamic map DB 212 includes, for example, in an order from static information to dynamic information, a map for estimating the vehicle position which is a traveling map (landmark information), a route map in a parking lot, for example, displayed for the user of the vehicle 10 (traveling plan), and the dynamic information (parked vehicle, obstacle, and the like). The API 213 is an API which exchanges various information with the information processing apparatus 100. The API 214 is an API which exchanges various information with the service group cloud 220.

Figure 10B:
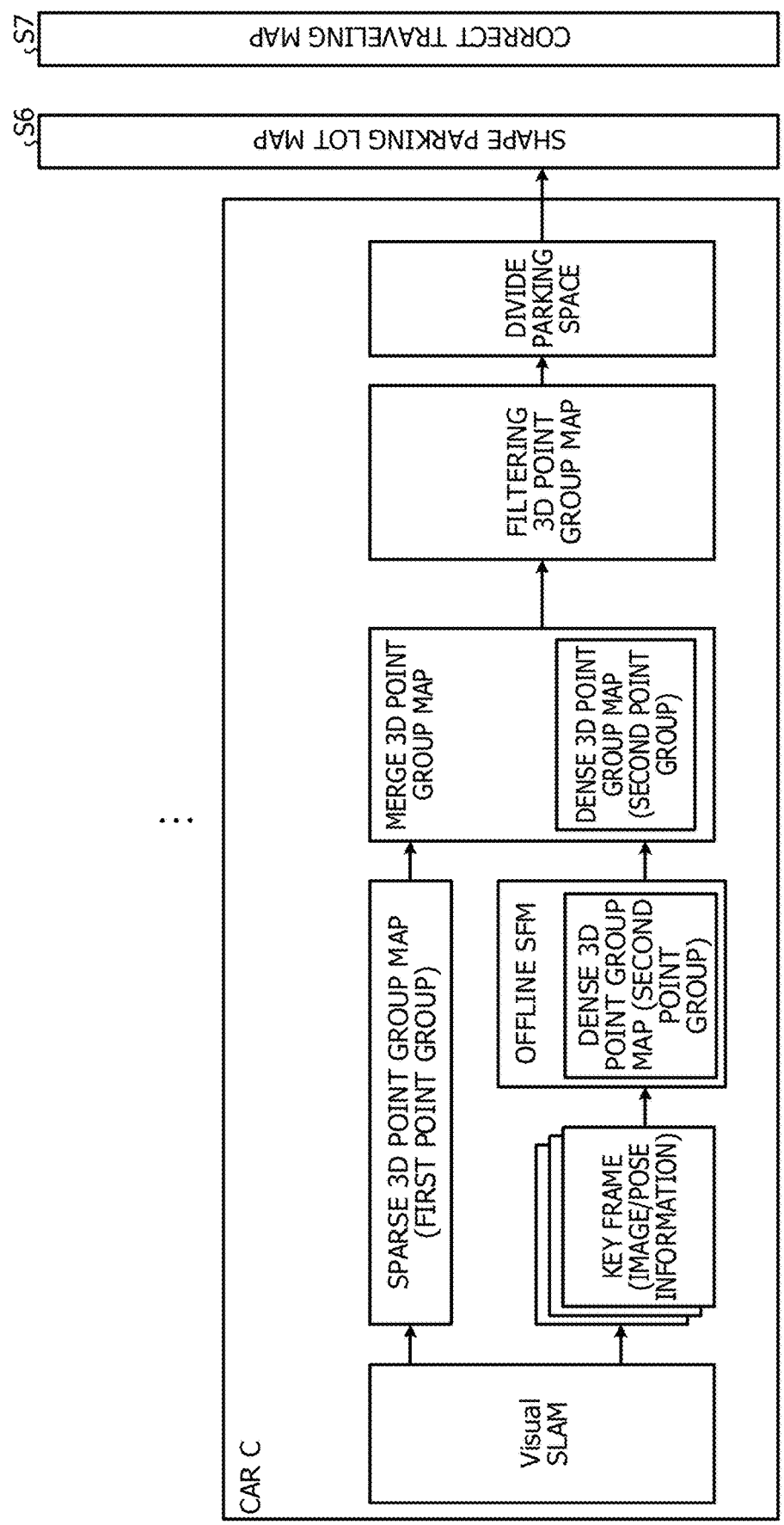

FIGS. 10A and 10B are a diagram illustrating an outline of the processing of the information processing system according to the embodiment. FIGS. 10A and 10B illustrate an outline of processing of the information processing system 1 in a case where a data flow is focused. A car A illustrated in FIGS. 10A and 10B is an example of the vehicle 10. The information processing apparatus 100 of the car A first generates a sparse 3D point group map 41 which is the first point group and a key frame 42 including an image and pose information indicating a position and a posture of the camera by the Visual SLAM (step S1). The sparse 3D point group map 41 is outputs of the vehicle position estimation and the traveling map generation processing which are real time processing. The information processing apparatus 100 of the car A executes offline structure from motion (SFM: also referred to as SfM below) processing which is not real time processing relative to the key frame 42 and generates a dense 3D point group map 43 which is the second point group (step S2).

The information processing apparatus 100 of the car A merges the 3D point group map. That is, the information processing apparatus 100 of the car A merges the sparse 3D point group map 41 with the dense 3D point group map 43 to generate a quasi-densified 3D point group map 44 which is the third point group (step S3). That is, the information processing apparatus 100 of the car A first executes quasi-densification processing 45 on a sparse point group. The information processing apparatus 100 of the car A executes filtering processing for extracting a parking space from the generated quasi-densified 3D point group map 44 (step S4). The information processing apparatus 100 of the car A divides the extracted parking space into individual parking areas based on a vehicle size and the like and generates a parking lot map (step S5). The information processing apparatus 100 of the car A transmits the generated parking lot map to the cloud 200. That is, the information processing apparatus 100 of the car A executes point group filtering and division processing 46 subsequent to the sparse point group quasi-densification processing 45.

When receiving the parking lot map, the cloud 200 compares the parking lot map with a parking lot map which has been already exists in the DB and shapes the parking lot map in the DB with the received parking lot map (step S6). That is, for example, when receiving parking lot maps of the same parking lot from cars B and C, the cloud 200 sequentially shapes the parking lot map in the DB and enhances the accuracy of the map. Furthermore, the cloud 200 corrects the traveling map in the DB based on the shaped parking lot map (step S7). That is, since the information processing system 1 updates map information in the DB with map information received from each vehicle 10, the accuracy can be more enhanced as the number of vehicles 10 increases. Furthermore, the information processing system 1 can reflect a change caused by entrance and exit of a car in and from the parking lot.

Figure 11:
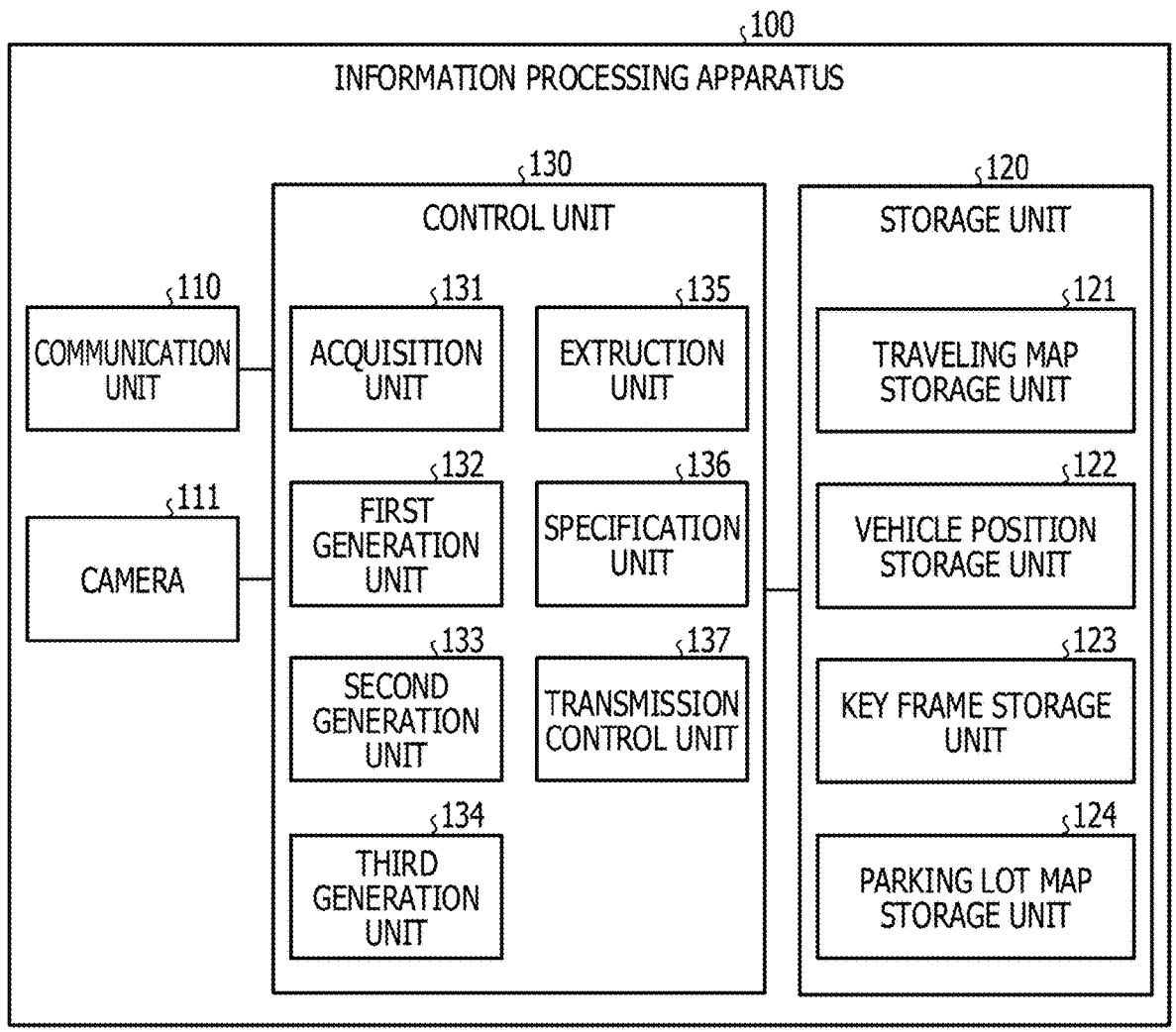
FIG. 11 is a block diagram illustrating an example of a functional configuration of an information processing apparatus according to the embodiment.

Subsequently, a functional configuration of the information processing apparatus 100 will be described with reference to FIG. 11. FIG. 11 is a block diagram illustrating an example of a functional configuration of the information processing apparatus according to the embodiment. As illustrated in FIG. 11, the information processing apparatus 100 includes a communication unit 110, a camera 111, a storage unit 120, and a control unit 130. Note that the information processing apparatus 100 may include various functional units included in a known computer, for example, functional units such as various display devices, input devices, audio output devices, and the like, in addition to the functional units illustrated in FIG. 11.

The communication unit 110 is implemented by, for example, a cellular phone line such as a third generation mobile communication system, the long term evolution (LTE), and the like, a communication module such as a wireless LAN, and the like. The communication unit 110 is a communication interface which is wirelessly connected to the cloud 200 via the network N and manages communication of information with the cloud 200. Note that, in a case where the information processing apparatus 100 and the cloud 200 are connected to each other via a wireless base station such as a cellular phone line, the wireless base station is wirelessly or wiredly connected to the cloud 200. When receiving the initial traveling map from the cloud 200, the communication unit 110 outputs the received initial traveling map to the control unit 130. Furthermore, the control unit 130 inputs vehicle position information, landmark change information, the traveling map, the travel history, the parking lot map, and the like to the communication unit 110. The communication unit 110 transmits the input vehicle position information, landmark change information, traveling map, travel history, parking lot map, and the like to the cloud 200.

The camera 111 is an imaging device which images surrounding environment of the vehicle 10. The camera 111 images an image by using, for example, a complementary metal oxide semiconductor (CMOS) image sensor or a charge coupled device (CCD) image sensor as an imaging element. The camera 111 photoelectrically converts light received by the imaging element and performs analog/digital (A/D) conversion to generate an imaged image. The camera 111 outputs the generated imaged image to the control unit 130.

The storage unit 120 is implemented by, for example, a storage device such as a semiconductor memory element such as a random access memory (RAM), a flash memory, and the like, a hard disk, an optical disk, and the like. The storage unit 120 includes a traveling map storage unit 121, a vehicle position storage unit 122, a key frame storage unit 123, and a parking lot map storage unit 124. Furthermore, the storage unit 120 stores information used for processing by the control unit 130.

The traveling map storage unit 121 stores the traveling map, that is, the first point group indicating the three-dimensional shape as a sparse point group of the environmental characteristic points. The traveling map storage unit 121 is sequentially updated by the SLAM when the vehicle 10 travels.

The vehicle position storage unit 122 stores the vehicle position and the travel history of the vehicle 10. When the vehicle 10 travels, the vehicle position storage unit 122 is sequentially updated by the SLAM similarly to the traveling map storage unit 121.

The key frame storage unit 123 stores a key frame including the image imaged by the camera and the pose information indicating the position and the posture of the camera. The key frame is data used for the SLAM and is generated when the first point group is generated. When the vehicle 10 travels, the key frame storage unit 123 is sequentially updated by the SLAM similarly to the traveling map storage unit 121.

The parking lot map storage unit 124 stores a parking lot map in which each parking area in a parking space is specified. The parking lot map storage unit 124 stores, for example, a parking lot map generated each time when the vehicle 10 travels in the parking lot once.

The description returns to the description of FIG. 11. The control unit 130 is implemented, for example, by executing a program stored in an internal storage device by a central processing unit (CPU), a micro processing unit (MPU), and the like using the RAM as a working region. Furthermore, the control unit 130 may be implemented by, for example, an integrated circuit such as an application specific integrated circuit (ASIC), a field programmable gate array (FPGA), and the like. The control unit 130 includes an acquisition unit 131, a first generation unit 132, a second generation unit 133, a third generation unit 134, an extraction unit 135, a specification unit 136, and a transmission control unit 137, and implements or executes functions and actions of information processing described below. Note that an internal configuration of the control unit 130 is not limited to the configuration illustrated in FIG. 11 and may be another configuration as long as the configuration executes the information processing described later.

When receiving the imaged image from the camera 111, the acquisition unit 131 starts to acquire the input imaged image. That is, the acquisition unit 131 starts to acquire the image imaged by the camera 111. The acquisition unit 131 outputs the acquired image to the first generation unit 132.

Furthermore, the acquisition unit 131 may acquire the initial traveling map from the cloud 200. The acquisition unit 131 transmits, for example, position information of a position detection device and the like which is not illustrated to the cloud 200 via the communication unit 110 and the network N. In a case where the cloud 200 includes the initial traveling map of the parking lot where the vehicle 10 is located, the acquisition unit 131 receives and acquires the initial traveling map from the cloud 200 via the network N and the communication unit 110. The acquisition unit 131 stores the acquired initial traveling map in the traveling map storage unit 121.

When receiving the image from the acquisition unit 131, the first generation unit 132 executes the SLAM based on the input image. As the SLAM, for example, concatenation of estimation results by Two-view SfM, sequential restoration by using Bundle adjustment, parallel tracking and mapping (PTAM), MonoSLAM, and the like can be used. Note that the PTAM is an algorithm in which Tracking and Mapping using the key frame and Bundle adjustment are parallelized. For example, the first generation unit 132 can generate the key frame including the input image and the pose information indicating the position and the posture of the camera 111, for example, by using the PTAM.

The first generation unit 132 generates the key frame including the image and the pose information indicating the position and the posture of the camera 111 based on the input image. The first generation unit 132 starts to estimate the vehicle position and to generate the first point group indicating a three-dimensional shape around the vehicle 10 based on the generated key frame. That is, the first generation unit 132 starts to estimate the vehicle position of the vehicle 10 and starts to generate the traveling map. Note that, in a case where the traveling map storage unit 121 stores the initial traveling map, the first generation unit 132 starts to update the initial traveling map. Furthermore, at the time of the generation of the traveling map, when determining that the vehicle has returned to the same point based on the key frame and the first point group, the first generation unit 132 performs bundle adjustment and corrects the first point group, that is, the traveling map. That is, the first generation unit 132 corrects the original first point group based on the current position of the vehicle 10, the key frame, and the first point group and generates or updates the traveling map.

The first generation unit 132 stores the generated first point group in the traveling map storage unit 121 as the traveling map. Furthermore, the first generation unit 132 stores the estimated vehicle position and the travel history in the vehicle position storage unit 122. Moreover, the first generation unit 132 stores the generated key frame in the key frame storage unit 123. It is possible that the traveling map storage unit 121, the vehicle position storage unit 122, and the key frame storage unit 123 are integrated as a single storage unit and the first point group, the vehicle position, the travel history, and the key frame are stored in the integrated storage unit. Furthermore, the first generation unit 132 starts to output the vehicle position information and the landmark change information which are the outputs of the SLAM to the transmission control unit 137.

In other words, the first generation unit 132 estimates the self-position of the first moving body by the first algorithm based on the acquired image and generates the first point group indicating the three-dimensional shape around the first moving body.

The first generation unit 132 determines whether or not the travel of the vehicle 10 ends based on the estimated vehicle position. In a case where it is determined that the travel of the vehicle 10 has not ended, the first generation unit 132 continuously estimates the vehicle position and generates the traveling map. When it is determined that the travel of the vehicle 10 has ended, the first generation unit 132 outputs a second point group generation instruction to the second generation unit 133.

Figure 12:
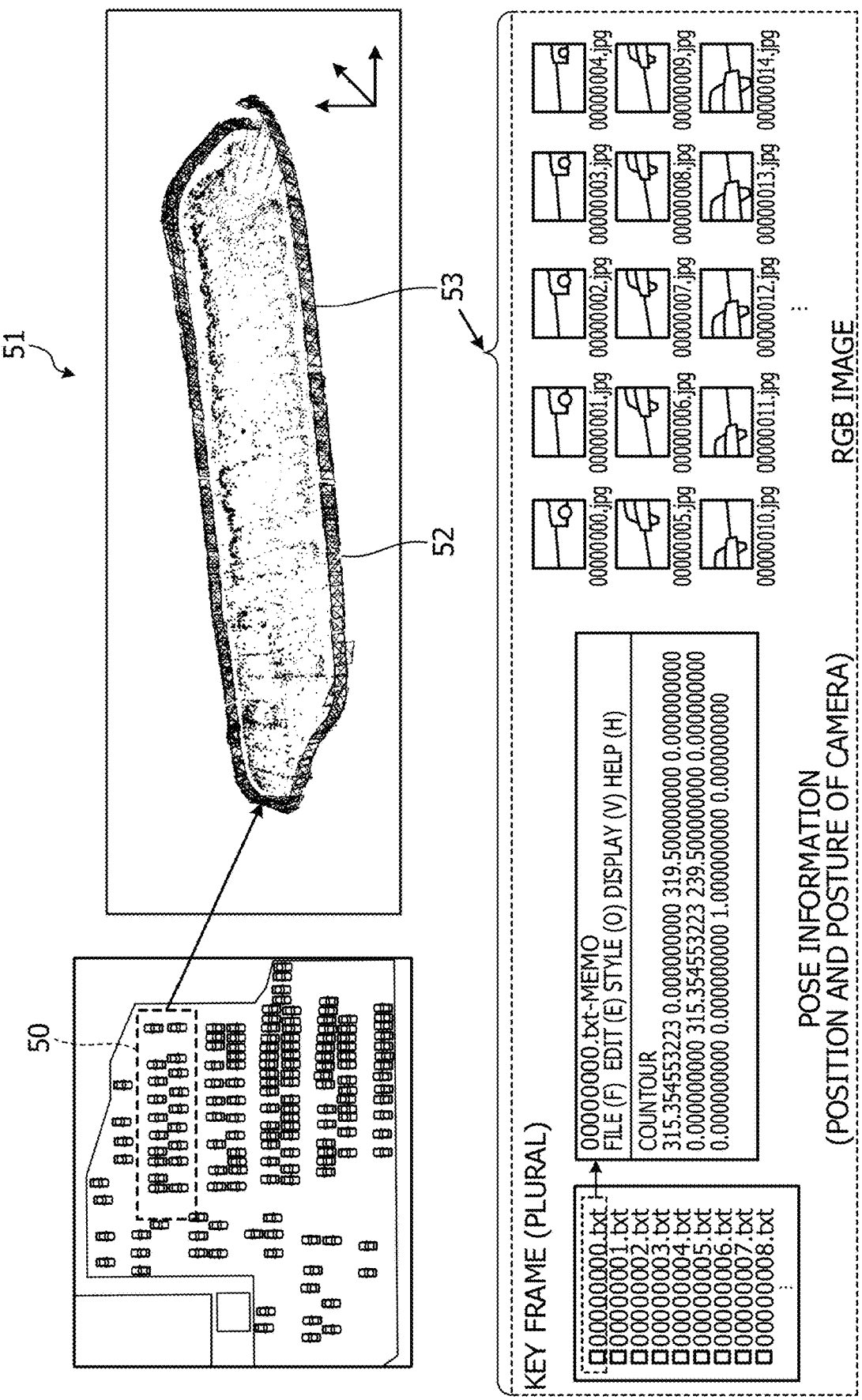
FIG. 12 is a diagram illustrating an example of output of the SLAM, an image, and pose information in a certain range of a parking lot.

Here, the output of the SLAM, the image, and the pose information will be described with reference to FIG. 12. FIG. 12 is a diagram illustrating an example of an output of the SLAM, an image, and pose information in a certain range of a parking lot. An example in FIG. 12 indicates an output of the SLAM in a case where the vehicle 10 travels in a predetermined region 50 in the parking lot. A traveling map 51 corresponding to the predetermined region 50 indicates a three-dimensional shape of a vehicle parked in the predetermined region 50. Furthermore, a current position 52 is a position of the vehicle 10 which has advanced about ⅓ round after traveling around the predetermined region 50 once. In a travel route of the vehicle 10, a plurality of key frames 53 is arranged along the travel route, and the bundle adjustment is performed at a start point. In each key frame 53, the pose information indicating the position and the posture of the camera 111 is associated with an RGB image at the position of each key frame 53. The second generation unit 133 obtains a dense point group by using the offline SFM based on these pieces of information.

The description returns to the description of FIG. 11. When receiving the second point group generation instruction from the first generation unit 132, the second generation unit 133 refers to the key frame storage unit 123 and acquires the image and the pose information of each key frame. The second generation unit 133 executes processing such as construction of a three-dimensional model, setting of a ground control point (GCP), and the like by the SfM based on the acquired image and pose information. Furthermore, the second generation unit 133 converts the constructed three-dimensional model into a terrain model and outputs the terrain model to the third generation unit 134 as the second point group. That is, the second generation unit 133 generates the second point group based on the key frame. In other words, the second generation unit 133 generates the second point group indicating a three-dimensional shape by the second algorithm based on data used in the first algorithm. Note that, for example, as the SfM, software such as Visual SFM and PMVS2/CMVS can be used.

That is, the second generation unit 133 generates a three-dimensional model by using all the images imaged in the parking lot. Therefore, the second point group output by the second generation unit 133 has a higher density than the first point group which is an output of the first generation unit 132. That is, although the first point group output by the first generation unit 132 has real-time property, the first point group is a sparse point group. Although the second point group output by the second generation unit 133 does not have the real-time property, the second point group is a dense point group.

When receiving the second point group from the second generation unit 133, the third generation unit 134 refers to the traveling map storage unit 121 and acquires the first point group. The third generation unit 134 merges the first point group with the second point group to generate the third point group. That is, the third generation unit 134 semi-densifies (Semi-Dense) the first point group. The third generation unit 134 outputs the generated third point group to the extraction unit 135.

Figure 13:
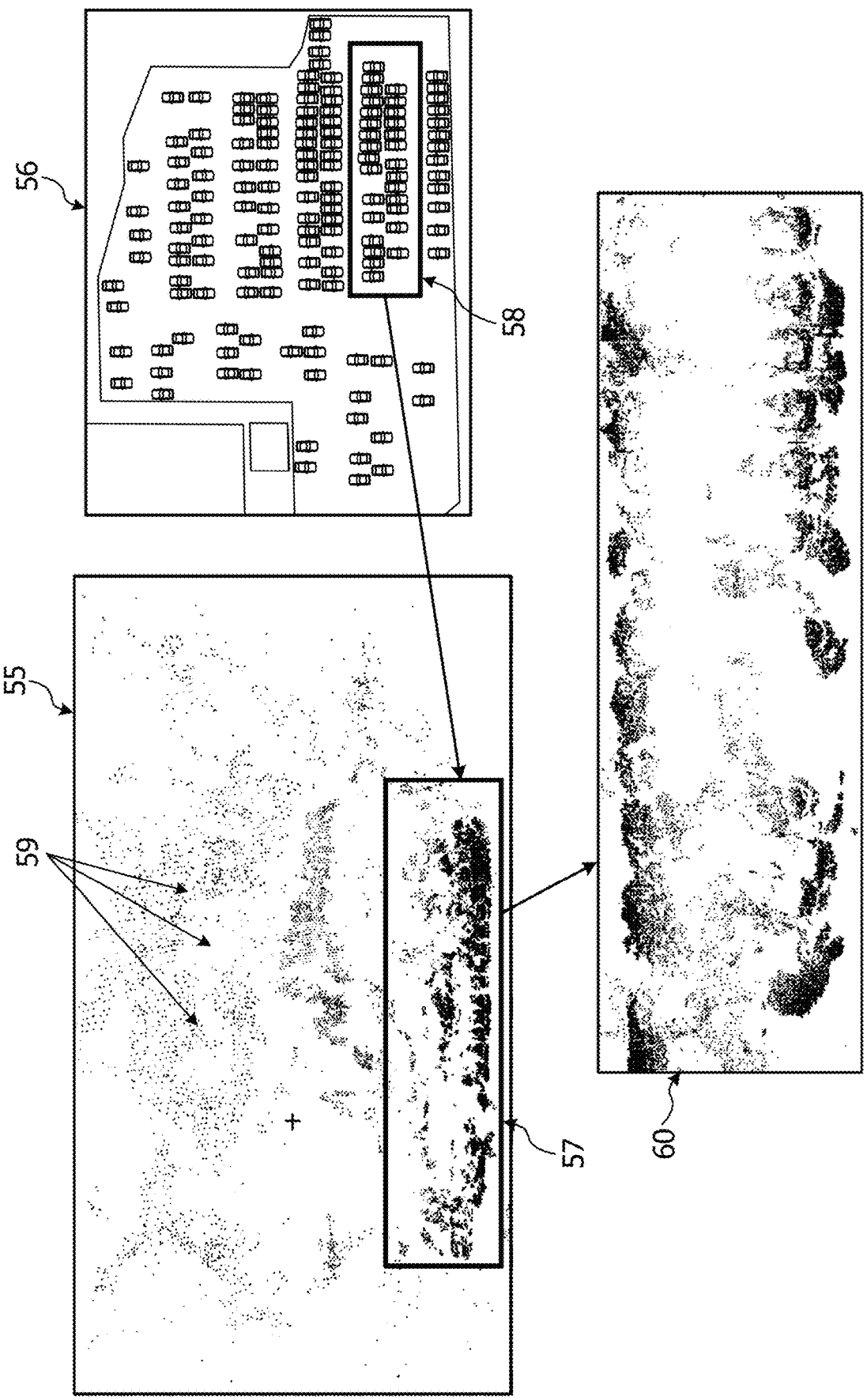
FIG. 13 is a diagram illustrating an example of a quasi-densified third point group.

Here, the quasi-densified third point group will be described with reference to FIG. 13. FIG. 13 is a diagram illustrating an example of the quasi-densified third point group. A point group 55 illustrated in FIG. 13 is an example of a third point group in a parking lot 56. A region 57 corresponds to a region 58 and includes many characteristic points of a vehicle parked in the region 58. Note that characteristic points 59 in an upper portion of the point group 55 are characteristic points of trees and the like positioned in the back of the parking lot 56. A point group 60 is an enlargement of the point group in the region 57 and expresses an outline of a vehicle on an aisle side to be recognized by a person.

The description returns to the description of FIG. 11. When receiving the third point group from the third generation unit 134, the extraction unit 135 extracts a parking space from the third point group. The extraction unit 135 refers to the vehicle position storage unit 122 and acquires the travel history of the vehicle 10 in the parking lot, that is, the movement track. The extraction unit 135 generates a 3D bounding box based on information regarding a size such as a width and a height of a vehicle which has been set in advance and the acquired movement track. The extraction unit 135 extracts the parking space from the third point group by filtering the third point group by using the generated bounding box. In other words, the extraction unit 135 extracts a space of an area group where the second moving body is parked from the third point group based on the movement track of the vehicle 10 which is the first moving body and the information regarding the size of the parked vehicle which is the second moving body. The extraction unit 135 outputs the point group of the extracted parking space to the specification unit 136.

Here, the extraction of the parking space will be described with reference to FIG. 14. FIG. 14 is a diagram illustrating an example of the extraction of the parking space. In the example in FIG. 14, the extraction unit 135 generates a bounding box 62 based on a movement track 61 which is a travel history of the vehicle 10 in the region 58 in the parking lot 56 and the information regarding the size of the vehicle which has been set in advance. The extraction unit 135 extracts a point group 63 by filtering the point group 55 by using the bounding box 62. Note that the point group 63 indicates a state of the parked vehicle viewed from the side, and a state of the point group 63 viewed from a viewpoint from above, that is, on the plane is as indicated by a point group 64.

The description returns to the description of FIG. 11. When receiving the point group of the parking space from the extraction unit 135, the specification unit 136 divides the parking space into parking areas for respective vehicles. The specification unit 136 divides the point group of the parking space into the parking areas for the respective vehicles based on a space distribution of the point group of the parking space and the information regarding the size such as the width and the height of the vehicle which has been set in advance. The specification unit 136 averages the widths and the depths of the respective divided parking areas and specifies each parking area. That is, the specification unit 136 divides the extracted space so as to specify each area in the area group. The specification unit 136 generates a parking lot map based on each specified parking area. The specification unit 136 stores the generated parking lot map in the parking lot map storage unit 124.

Figure 15:
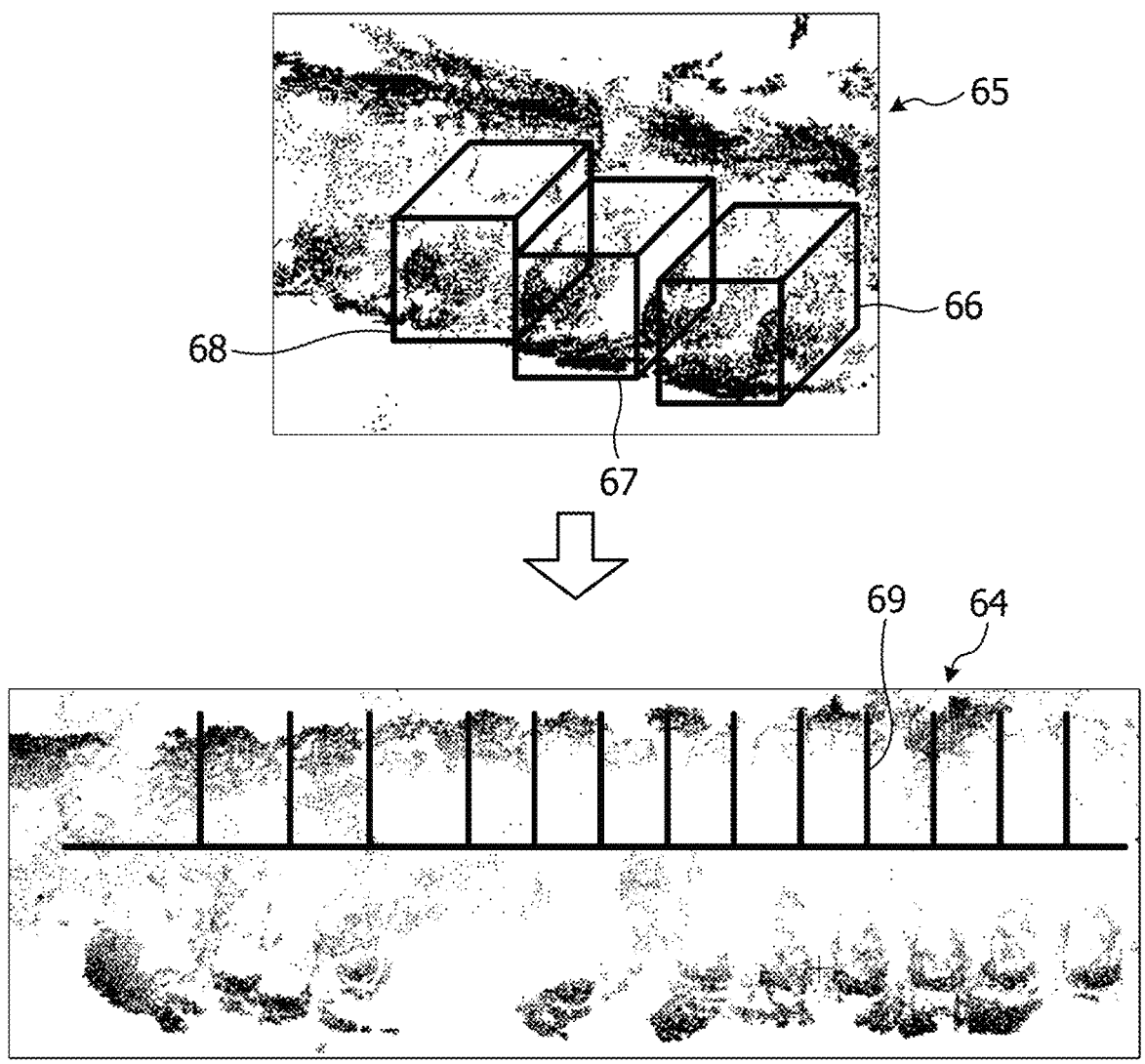
FIG. 15 is a diagram illustrating an example of division of the parking space.

Here, the division of the parking space and the specification of the parking area will be described with reference to FIGS. 15 and 16. FIG. 15 is a diagram illustrating an example of the division of the parking space. In the example in FIG. 15, the specification unit 136 divides a point group 65 into parking areas 66, 67, and 68 based on a space distribution of the point group 65 which is a part of the point group 63 of the parking space and the information regarding the size of the vehicle. The specification unit 136 similarly divides other parts of the point group 63 of the parking space into parking areas and generates a parking area group 69 by arranging the parking areas into the point group 64 on the plane. Note that since the point group 65 is a three-dimensional point group, gaps between the parked vehicles can be more easily found than those in a two-dimensional image.

Figure 16:
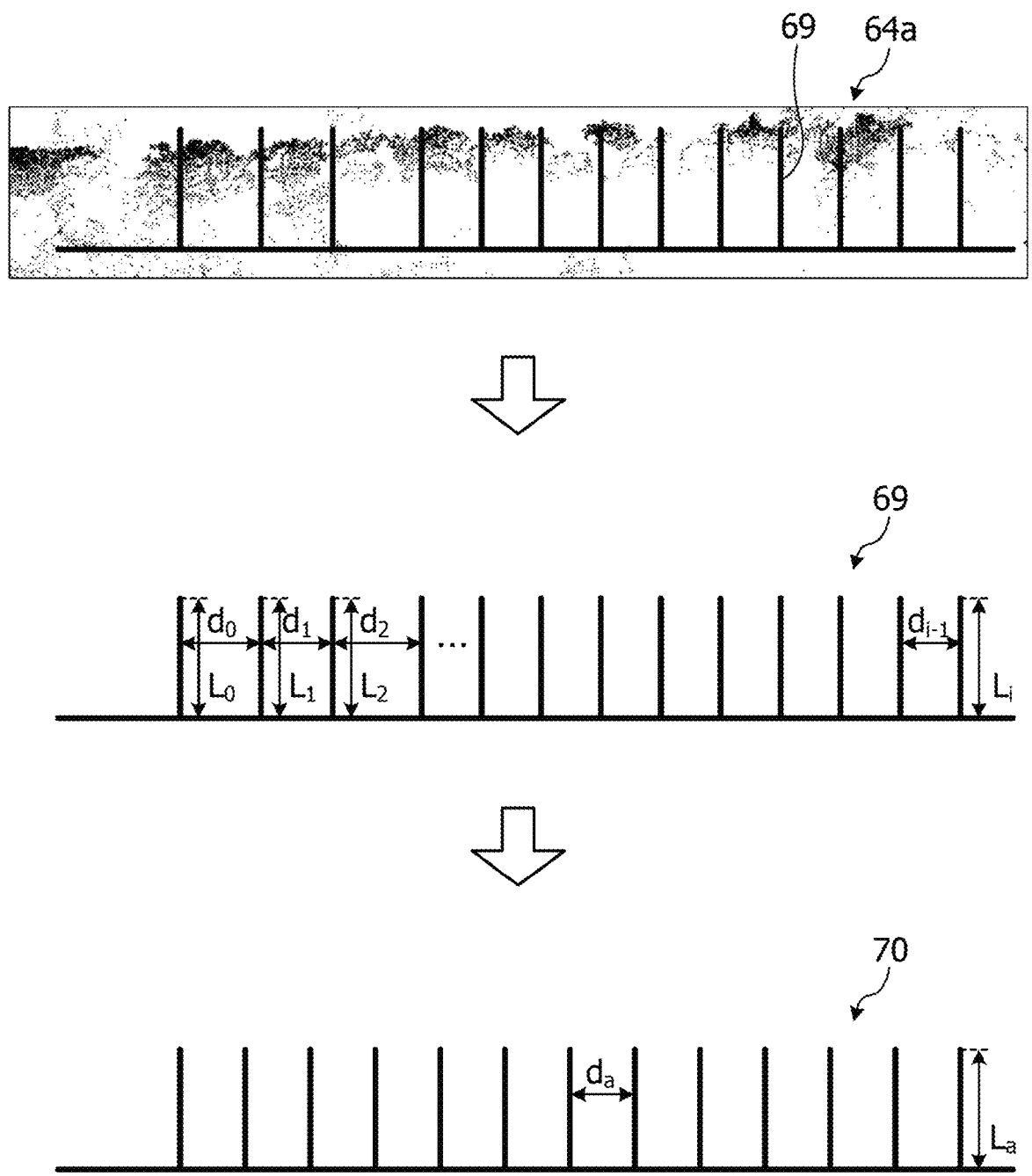
FIG. 16 is a diagram illustrating an example of specification of a parking area.

FIG. 16 is a diagram illustrating an example of the specification of the parking area. In the example in FIG. 16, the specification unit 136 calculates an average value $d_a$ of widths $d_0$ to $d_{i-1}$ of respective parking areas in the parking area group 69 corresponding to a point group 64a which is a part of the point group 64. Furthermore, the specification unit 136 calculates an average value $L_a$ of depths $L_0$ to $L_i$ of the respective parking areas. The specification unit 136 specifies a parking area having the width $d_a$ and the depth $L_a$ and generates a parking area group 70 by combining the plurality of specified parking areas. The specification unit 136 stores the generated parking area group 70 in the parking lot map storage unit 124 as a parking lot map. In other words, the specification unit 136 calculates average values of widths and depths of areas of the area group in the extracted space and divides the space and specifies each area of the area group based on the calculated average values of the widths and the depths of the respective areas.

Furthermore, the specification unit 136 corrects the traveling map stored in the traveling map storage unit 121 based on the generated parking lot map. The specification unit 136 generates a three-dimensional template point group based on the generated parking lot map. The specification unit 136 corrects the traveling map acquired from the traveling map storage unit 121, that is, the first point group by non-rigid iterative closest point (ICP) alignment, for example, using the generated template point group as a template. That is, the specification unit 136 corrects the first point group which is the traveling map. That is, the specification unit 136 corrects a drift error of the traveling map by using the parking lot map. In other words, the specification unit 136 corrects a drift of the first point group by aligning the first point group based on the width and the depth of each specified area. The specification unit 136 stores the corrected traveling map in the traveling map storage unit 121. When storing the corrected traveling map in the traveling map storage unit 121, the specification unit 136 outputs a map transmission instruction to the transmission control unit 137.

Here, the correction of the traveling map will be described with reference to FIG. 17. FIG. 17 is a diagram illustrating an example of the correction of the traveling map based on the width and the depth of the specified parking area. As illustrated in FIG. 17, the specification unit 136 generates a three-dimensional template point group 71 based on the parking area group 70. The specification unit 136 corrects the drift error by the alignment using a non-rigid ICP algorithm relative to a first point group 72 by using the generated template point group 71. The specification unit 136, for example, generates the template point group 71 based on the parking area group 70 which is a part of the parking lot and applies the generated point group to other part of the parking lot so as to correct a drift error of the other part.

Specifically, the specification unit 136 aligns the first point group 72 by using the template point group 71 so as to correct the drift error of the first point group 72. That is, the specification unit 136 makes correction by deforming each characteristic point of the first point group 72 so as to be closer to each corresponding characteristic point of the template point group 71. The specification unit 136 stores the first point group of which the drift error has been corrected, that is, the traveling map in the traveling map storage unit 121.

The description returns to the description of FIG. 11. When input of the vehicle position information and the landmark change information from the first generation unit 132 is started, the transmission control unit 137 starts to transmit the vehicle position information and the landmark change information to the cloud 200 via the communication unit 110 and the network N. Furthermore, when receiving the map transmission instruction from the specification unit 136, the transmission control unit 137 refers to the traveling map storage unit 121 and the parking lot map storage unit 124 and transmits the traveling map and the parking lot map to the cloud 200 via the communication unit 110 and the network N. Note that the transmission control unit 137 may refer to the vehicle position storage unit 122 and transmit the travel history of the vehicle 10 to the cloud 200 together with the traveling map and the parking lot map.

Figure 18:
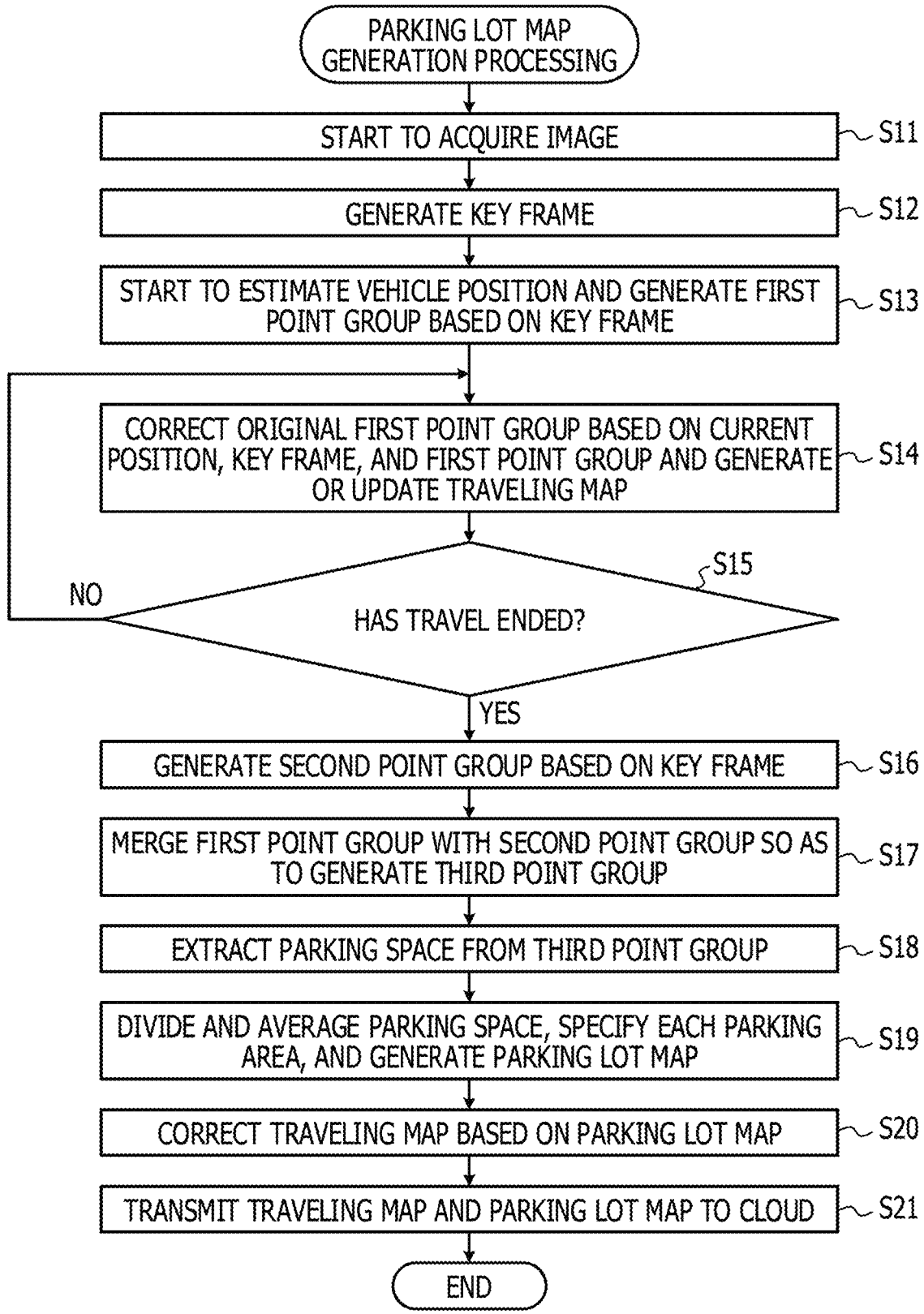
FIG. 18 is a flowchart illustrating an example of parking lot map generation processing according to the embodiment.

Next, an operation of the information processing apparatus 100 according to the embodiment will be described. FIG. 18 is a flowchart illustrating an example of parking lot map generation processing according to the embodiment.

The acquisition unit 131 starts to acquire an image imaged by the camera 111 (step S11). The acquisition unit 131 outputs the acquired image to the first generation unit 132. When receiving the image from the acquisition unit 131, the first generation unit 132 executes the SLAM based on the input image and generates the key frame including the image and the pose information (step S12). The first generation unit 132 starts to estimate the vehicle position and generate the first point group based on the generated key frame (step S13).

The first generation unit 132 corrects the original first point group based on the current position of the vehicle 10, the key frame, and the first point group and generates or updates the traveling map (step S14). The first generation unit 132 stores the generated first point group in the traveling map storage unit 121 as the traveling map. Furthermore, the first generation unit 132 stores the estimated vehicle position and the travel history in the vehicle position storage unit 122. Moreover, the first generation unit 132 stores the generated key frame in the key frame storage unit 123.

The first generation unit 132 determines whether or not the travel of the vehicle 10 ends based on the estimated vehicle position (step S15). In a case where it is determined that the travel of the vehicle 10 has not ended (step S15: No), the first generation unit 132 returns to step S14. When it is determined that the travel of the vehicle 10 has ended (step S15: Yes), the first generation unit 132 outputs a second point group generation instruction to the second generation unit 133.

When receiving the second point group generation instruction from the first generation unit 132, the second generation unit 133 refers to the key frame storage unit 123 and acquires the key frame. The second generation unit 133 generates the second point group based on the acquired key frame and outputs the generated second point group to the third generation unit 134 (step S16).

When receiving the second point group from the second generation unit 133, the third generation unit 134 refers to the traveling map storage unit 121 and acquires the first point group. The third generation unit 134 merges the first point group with the second point group so as to generate the third point group (step S17). The third generation unit 134 outputs the generated third point group to the extraction unit 135.

When receiving the third point group from the third generation unit 134, the extraction unit 135 extracts a parking space from the third point group (step S18). The extraction unit 135 outputs the point group of the extracted parking space to the specification unit 136. When receiving the point group of the parking space from the extraction unit 135, the specification unit 136 divides the parking space into parking areas for respective vehicles. The specification unit 136 averages the widths and the depths of the respective divided parking areas and specifies each parking area. The specification unit 136 generates a parking lot map based on each specified parking area (step S19). The specification unit 136 stores the generated parking lot map in the parking lot map storage unit 124.

The specification unit 136 corrects the traveling map stored in the traveling map storage unit 121 based on the generated parking lot map (step S20). When correcting the traveling map, the specification unit 136 outputs the map transmission instruction to the transmission control unit 137.

When receiving the map transmission instruction from the specification unit 136, the transmission control unit 137 refers to the traveling map storage unit 121 and the parking lot map storage unit 124 and transmits the traveling map and the parking lot map to the cloud 200 (step S21). With this operation, the information processing apparatus 100 can easily specify the parking area.

In this way, the information processing apparatus 100 acquires the image imaged by the camera 111, that is, an imaging device provided in the vehicle 10 which is the first moving body. Furthermore, the information processing apparatus 100 estimates the self-position of the first moving body by the first algorithm based on the acquired image and generates the first point group indicating the three-dimensional shape around the first moving body. Furthermore, the information processing apparatus 100 generates a second point group indicating a three-dimensional shape by a second algorithm based on data used in the first algorithm. Furthermore, the information processing apparatus 100 merges the generated first point group with the generated second point group so as to generate the third point group. Furthermore, the information processing apparatus 100 extracts the space of the area group where the second moving body is parked from the third point group based on the movement track of the first moving body and the information regarding the size of the second moving body. Furthermore, the information processing apparatus 100 divides the extracted space and specifies each area of the area group. As a result, the information processing apparatus 100 can easily specify the parking area.

Furthermore, the information processing apparatus 100 calculates the average values of the widths and the depths of the respective areas of the area group in the extracted space. Furthermore, the information processing apparatus 100 divides the space and specifies each area of the area group based on the calculated average values of the widths and the depths of the respective areas. As a result, the information processing apparatus 100 can easily specify the parking area even in a parking lot where vehicles having different sizes are parked.

Furthermore, the information processing apparatus 100 corrects the drift of the first point group by aligning the first point group based on the width and the depth of each specified area. As a result, the information processing apparatus 100 can correct the drift error of the traveling map.

Furthermore, in the information processing apparatus 100, the second moving body is a vehicle, that is, a car. Furthermore, the information processing apparatus 100 divides the space and specifies each parking area of the area group where the car is parked. As a result, the information processing apparatus 100 can easily specify the parking area of the car.

Note that, the vehicle 10 has been used as a moving body in the embodiment described above. However, the moving body is not limited to this. For example, a parking lot map may be generated by acquiring an image by using a so-called drone such as an unmanned aerial vehicle (UAV) and the like.

Furthermore, in the above embodiment, the database which stores various information acquired from the plurality of vehicles 10 has been configured as the cloud 200. However, the database is not limited to this. For example, a single server and a server group may be used instead of the cloud.

In addition, each component of each illustrated unit is not necessarily physically configured as illustrated. That is, specific aspects of separation and integration of the respective units are not limited to the illustrated forms, and all or a part of the apparatus can be functionally or physically separated and integrated in an arbitrary unit according to various loads and use states. For example, the extraction unit 135 and the specification unit 136 may be integrated. Furthermore, the order of each illustrated processing is not limited to the order described above, and the processing may be concurrently executed or may be executed as changing the order in a range in which the processing content does not contradict.

Furthermore, all or an arbitrary part of various processing functions executed by each device may be executed by a CPU (or microcomputer such as MPU and micro controller unit (MCU)). Furthermore, it goes without saying that all or an arbitrary part of various processing functions may be executed by a program analyzed and executed by a CPU (or microcomputer such as MPU and MCU) or hardware using wired logic.

Figure 19:
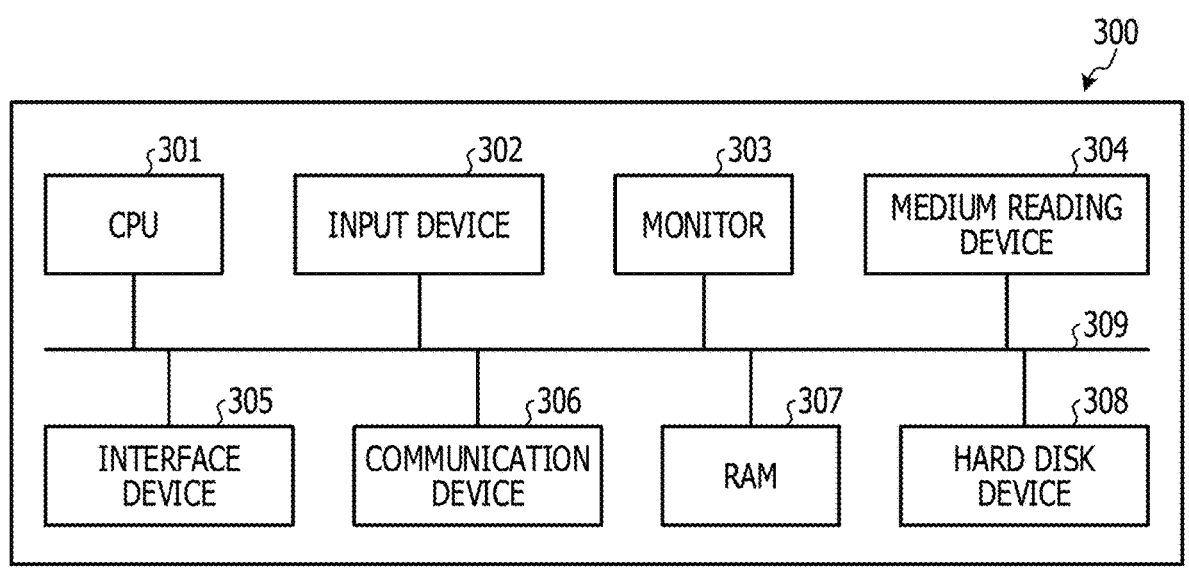
FIG. 19 is a diagram illustrating an example of a computer for executing an information processing program.

The various processing described in the embodiment described above can be implemented by executing the program which has been prepared in advance by a computer. Therefore, in the following description, an example of the computer which executes a program having a similar function to the above embodiment will be described. FIG. 19 is a diagram illustrating an example of a computer for executing an information processing program.

As illustrated in FIG. 19, a computer 300 includes a CPU 301 which executes various calculation processing, an input device 302 which receives data input, and a monitor 303. Furthermore, the computer 300 includes a medium reading device 304 which reads a program and the like from a storage medium, an interface device 305 which connects to various devices, and a communication device 306 which wiredly or wirelessly connects to other information processing apparatus and the like. Furthermore, the computer 300 includes a RAM 307 which temporarily stores various information and a hard disk device 308. Each of the devices 301 to 308 is connected to a bus 309.

The hard disk device 308 stores information processing programs having similar functions to functions of the respective processing units of the acquisition unit 131, the first generation unit 132, the second generation unit 133, the third generation unit 134, the extraction unit 135, the specification unit 136, and the transmission control unit 137 illustrated in FIG. 11. Furthermore, the hard disk device 308 stores various data for realizing the traveling map storage unit 121, the vehicle position storage unit 122, the key frame storage unit 123, the parking lot map storage unit 124, and the information processing program. For example, the input device 302 receives inputs of various information such as operation information from a user of the computer 300. For example, the monitor 303 displays various screens such as a display screen to the user of the computer 300. For example, the interface device 305 is connected to a camera and the like. The communication device 306, for example, has a function similar to the communication unit 110 illustrated in FIG. 11, is connected to the network N, and exchanges various information to the cloud 200.

The CPU 301 reads each program stored in the hard disk device 308 and develops and executes the program to the RAM 307 so as to execute various processing. Furthermore, these programs can make the computer 300 function as the acquisition unit 131, the first generation unit 132, the second generation unit 133, the third generation unit 134, the extraction unit 135, the specification unit 136, and the transmission control unit 137 illustrated in FIG. 11.

Note that it is not necessary for the information processing program to be stored in the hard disk device 308. For example, the program stored in a storage medium which can be read by the computer 300 may be read and executed by the computer 300. The storage medium which can be read by the computer 300 corresponds to, for example, a portable recording medium such as a CD-ROM, a DVD disk, and an universal serial bus (USB), a semiconductor memory such as a flash memory, a hard disk drive, and the like. Furthermore, it is possible that the information processing program is stored in a device connected to a public line, the Internet, a LAN, and the like and the computer 300 reads and executes the information processing program from the device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an information processing program for causing a computer to execute processing comprising:
acquiring an image which is imaged by an imaging device provided in a first moving body;
estimating a self-position of the first moving body by a first algorithm based on the acquired image;
generating a first point group that indicates a three-dimensional shape around the first moving body;
generating a second point group that indicates the three-dimensional shape by a second algorithm based on data which is used in the first algorithm;
merging the generated first point group and second point group so as to generate a third point group;
extracting a space of an area group where a second moving body is parked from the third point group based on a movement track of the first moving body and information regarding a size of the second moving body;
dividing the extracted space; and
specifying each area of the area group.

2. The non-transitory computer-readable recording medium according to claim 1, wherein
in the specifying processing, average values of widths and depths of the respective areas of the area group in the extracted space are calculated, and the each area of the area group is specified by dividing the space based on the calculated average values of the widths and the depths of the respective areas.

3. The non-transitory computer-readable recording medium according to claim 2, wherein the processing further includes:
correcting a drift of the first point group by aligning the first point group based on the width and the depth of the each specified area.

4. The non-transitory computer-readable recording medium according to claim 1, wherein
the second moving body is a car, and
the specifying processing includes specifying each parking area of the area group where the car is parked by dividing the space.

5. An information processing method, comprising:
acquiring, by a computer, an image which is imaged by an imaging device provided in a first moving body;
estimating a self-position of the first moving body by a first algorithm based on the acquired image and generating a first point group that indicates a three-dimensional shape around the first moving body;
generating a second point group that indicates the three-dimensional shape by a second algorithm based on data which is used in the first algorithm;

merging the generated first point group and second point group area so as to generate a third point group;

extracting a space of an area group where a second moving body is parked from the third point group based on a movement track of the first moving body and information regarding a size of the second moving body; and dividing the extracted space and specifying each area of the area group.

6. The information processing method according to claim 5, wherein in the specifying, average values of widths and depths of the respective areas of the area group in the extracted space are calculated, and the each area of the area group is specified by dividing the space based on the calculated average values of the widths and the depths of the respective areas.

7. The information processing method according to claim 6, wherein further comprising:

correcting a drift of the first point group by aligning the first point group based on the width and the depth of the each specified area.

8. The information processing method according to claim 5, wherein the second moving body is a car, and the specifying includes specifying each parking area of the area group where the car is parked by dividing the space.

9. An information processing apparatus comprising:

a memory; and a processor coupled to the memory and configured to:

acquire an image which is imaged by an imaging device provided in a first moving body;

estimate a self-position of the first moving body by a first algorithm based on the acquired image and generate a first point group that indicates a three-dimensional shape around the first moving body;

generate a second point group that indicates the three-dimensional shape by a second algorithm based on data which is used in the first algorithm;

merge the generated first point group and second point group so as to generate a third point group;

extract a space of an area group where a second moving body is parked from the third point group based on a movement track of the first moving body and information regarding a size of the second moving body; and divide the extracted space and specify each area of the area group.

10. The information processing apparatus according to claim 9, wherein the processor is configured to:

calculate average values of widths and depths of the respective areas of the area group in the extracted space; and specify the each area of the area group by dividing the space based on the calculated average values of the widths and the depths of the respective areas.

11. The information processing apparatus according to claim 10, wherein the processor is configured to:

correct a drift of the first point group by aligning the first point group based on the width and the depth of the each specified area.

12. The information processing apparatus according to claim 9, wherein the second moving body is a car, and each parking area of the area group where the car is parked by dividing the space is specified.

* * * * *